United States Patent
Wang et al.

(10) Patent No.: US 10,798,662 B2
(45) Date of Patent: Oct. 6, 2020

(54) METHOD FOR REPORTING POWER HEADROOM AND CORRESPONDING USER EQUIPMENT

(71) Applicant: Samsung Electronics Co., Ltd., Gyeonggi-do (KR)

(72) Inventors: Yi Wang, Beijing (CN); Yingyang Li, Beijing (CN); Jingxing Fu, Beijing (CN); Shichang Zhang, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/322,376

(22) PCT Filed: Aug. 1, 2017

(86) PCT No.: PCT/KR2017/008281
§ 371 (c)(1),
(2) Date: Jan. 31, 2019

(87) PCT Pub. No.: WO2018/026165
PCT Pub. Date: Feb. 8, 2018

(65) Prior Publication Data
US 2019/0174432 A1    Jun. 6, 2019

(30) Foreign Application Priority Data

Aug. 1, 2016   (CN) .......................... 2016 1 0622019
Aug. 31, 2016   (CN) .......................... 2016 1 0796848
(Continued)

(51) Int. Cl.
*H04B 7/00*    (2006.01)
*H04W 52/36*   (2009.01)
(Continued)

(52) U.S. Cl.
CPC ......... *H04W 52/365* (2013.01); *H04L 5/0048* (2013.01); *H04W 72/1284* (2013.01); *H04W 72/1289* (2013.01); *H04W 72/14* (2013.01)

(58) Field of Classification Search
USPC ........................................ 455/522, 68, 450
See application file for complete search history.

(56) References Cited

U.S. PATENT DOCUMENTS 9,520,984 B2 *  12/2016  Yang .................... H04W 52/146
9,603,098 B2 *   3/2017  Ryoo .................... H04W 52/34
(Continued)

FOREIGN PATENT DOCUMENTS

WO   WO 2015041406   3/2015

OTHER PUBLICATIONS

Ericsson, Summary of E-mail Discussion [71#57] LTE CA: PHR Reporting, R2-105462, 3GPP TSG-RAN WG2 #71bis, Oct. 11-15, 2010, 16 pages.
(Continued)

*Primary Examiner* — Ankur Jain
*Assistant Examiner* — Max Mathew
(74) *Attorney, Agent, or Firm* — The Farrell Law Firm, P.C.

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

16 Claims, 20 Drawing Sheets

(30) Foreign Application Priority Data

Oct. 11, 2016 (CN) .......................... 2016 1 0887661
Oct. 25, 2016 (CN) .......................... 2016 1 0941521
Jul. 10, 2017 (CN) .......................... 2017 1 0558248

(51) Int. Cl.
*H04W 72/12* (2009.01)
*H04L 5/00* (2006.01)
*H04W 72/14* (2009.01)

(56) References Cited

U.S. PATENT DOCUMENTS

| | | | | |
|---|---|---|---|---|
| 9,629,097 | B2* | 4/2017 | Ahn | H04W 52/146 |
| 10,326,562 | B2* | 6/2019 | Kim | H04W 24/08 |
| 2012/0044882 | A1* | 2/2012 | Kim | H04L 5/0094 |
| | | | | 370/329 |
| 2012/0294167 | A1* | 11/2012 | Zhu | H04W 52/146 |
| | | | | 370/252 |
| 2012/0314619 | A1* | 12/2012 | Wiberg | H04W 74/0833 |
| | | | | 370/254 |
| 2013/0010720 | A1 | 1/2013 | Lohr et al. | |
| 2013/0051259 | A1* | 2/2013 | Kim | H04W 52/365 |
| | | | | 370/252 |
| 2013/0100925 | A1* | 4/2013 | Ahn | H04L 5/0037 |
| | | | | 370/329 |
| 2013/0148619 | A1 | 6/2013 | Ahn et al. | |
| 2016/0100407 | A1* | 4/2016 | Gaal | H04L 5/0051 |
| | | | | 370/329 |
| 2016/0174173 | A1 | 6/2016 | Lee et al. | |
| 2016/0183290 | A1 | 6/2016 | Ko et al. | |
| 2017/0078983 | A1* | 3/2017 | Ahn | H04W 52/146 |
| 2017/0290014 | A1* | 10/2017 | Kim | H04W 72/0453 |
| 2018/0048498 | A1* | 2/2018 | Stern-Berkowitz | H04W 72/1268 |
| 2018/0167823 | A1* | 6/2018 | Uchino | H04W 72/14 |
| 2018/0376434 | A1* | 12/2018 | Cui | H04W 52/365 |
| 2019/0045458 | A1* | 2/2019 | Harada | H04W 16/14 |

OTHER PUBLICATIONS

European Search Report dated Apr. 17, 2019 issued in counterpart application No. 17837216.5-1215, 10 pages.
PCT/ISA/210 Search Report issued on PCT/KR2017/008281 (pp. 3).
PCT/ISA/237 Written Opinion issued on PCT/KR2017/008281 (pp. 5).
3GPP TS 36.321 V13.2.0 (Jun. 2016), Technical Specification, 3rd Generation Partnership Project; Technical Specification Group Radio Access Network; Evolved Universal Terrestrial Radio Access (E-UTRA); Medium Access Control (MAC) protocol specification (Release 13), Copyright 2016 3GPP Organizational Partners (pp. 94).

* cited by examiner

[Fig. 1]

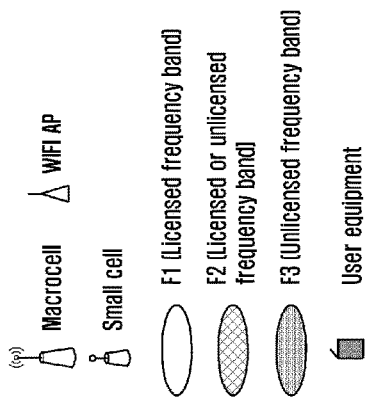

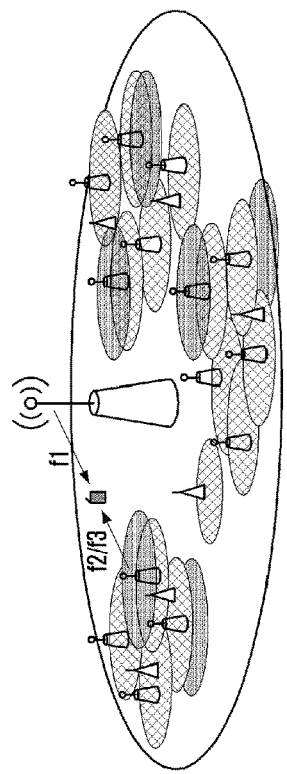

[Fig. 2]

By a user equipment, receive uplink scheduling information, and determine a corresponding uplink transmit power on each uplink carrier according to the uplink scheduling information, a first reference subframe being a subframe which is determined according to the uplink scheduling information to transmit an uplink channel/signal ~S201

According to an actual maximum uplink transmit power of the first reference subframe of the user equipment and a predefined first priority, adjust the determined uplink transmit power of each uplink carrier, and/ or determine whether to transmit the uplink signal ~S202

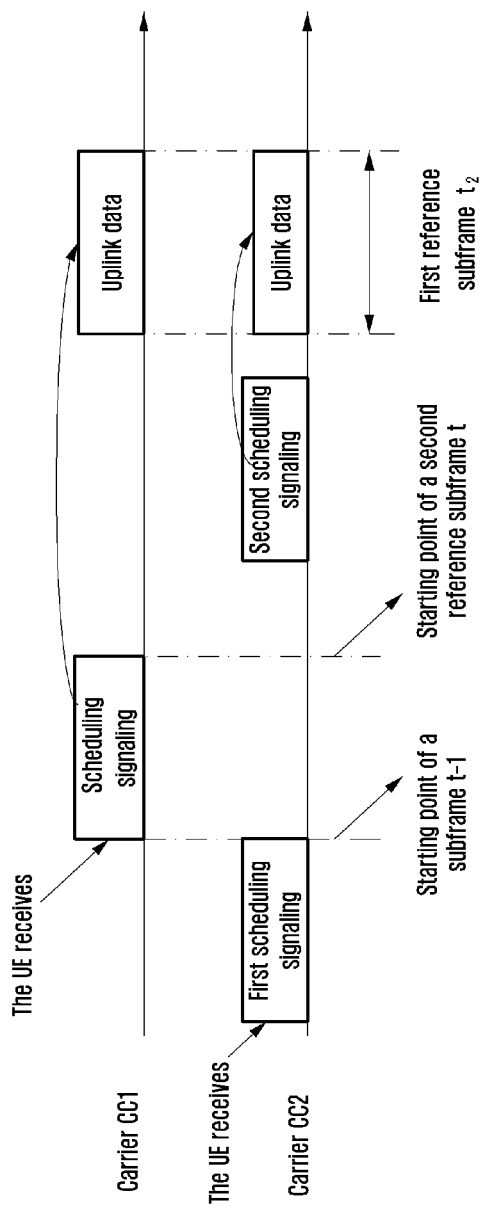
[Fig. 3]

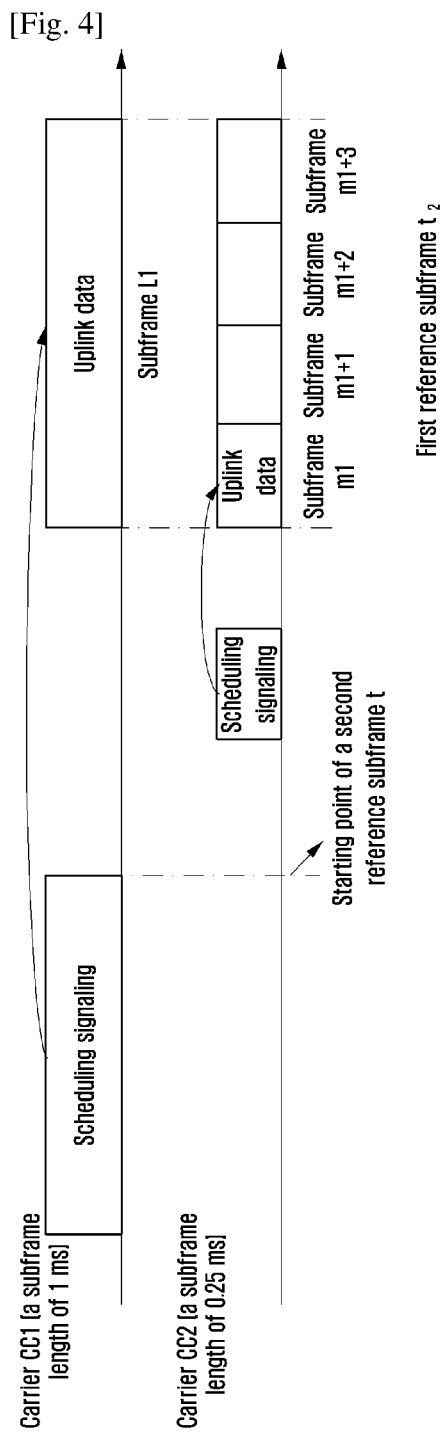

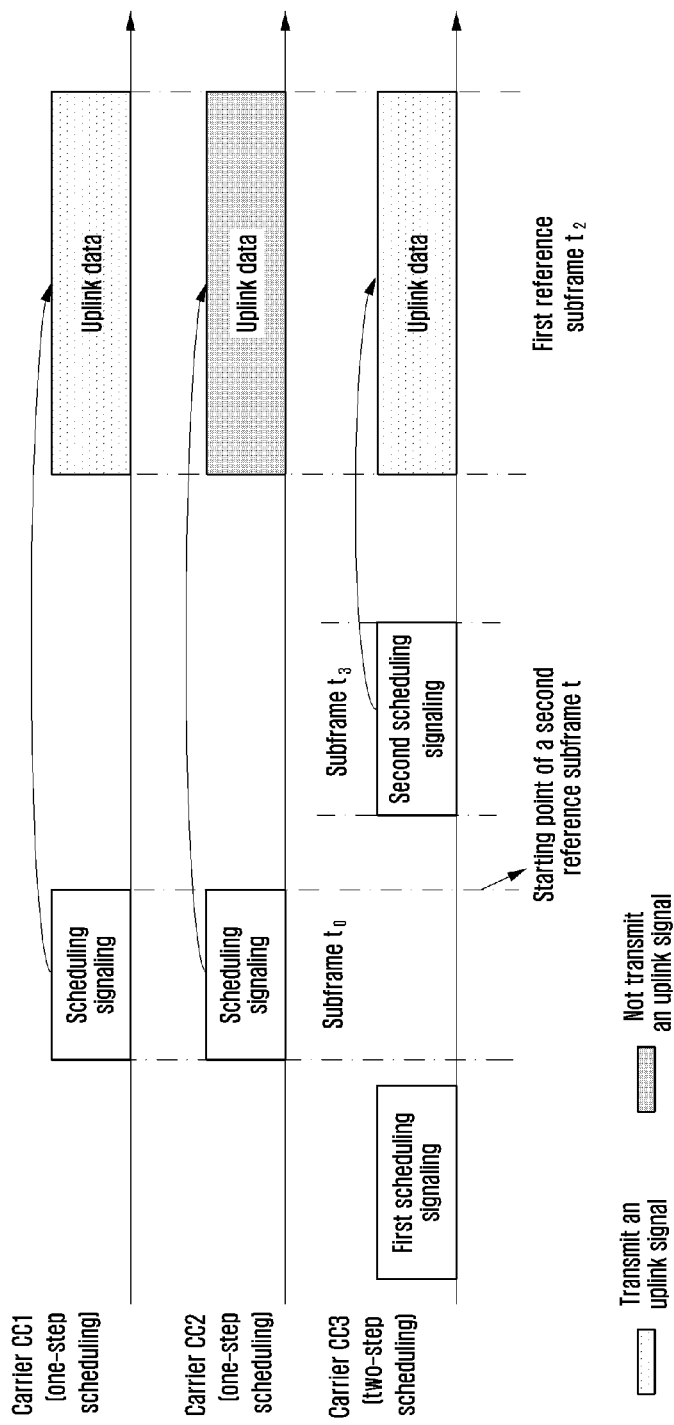
[Fig. 5]

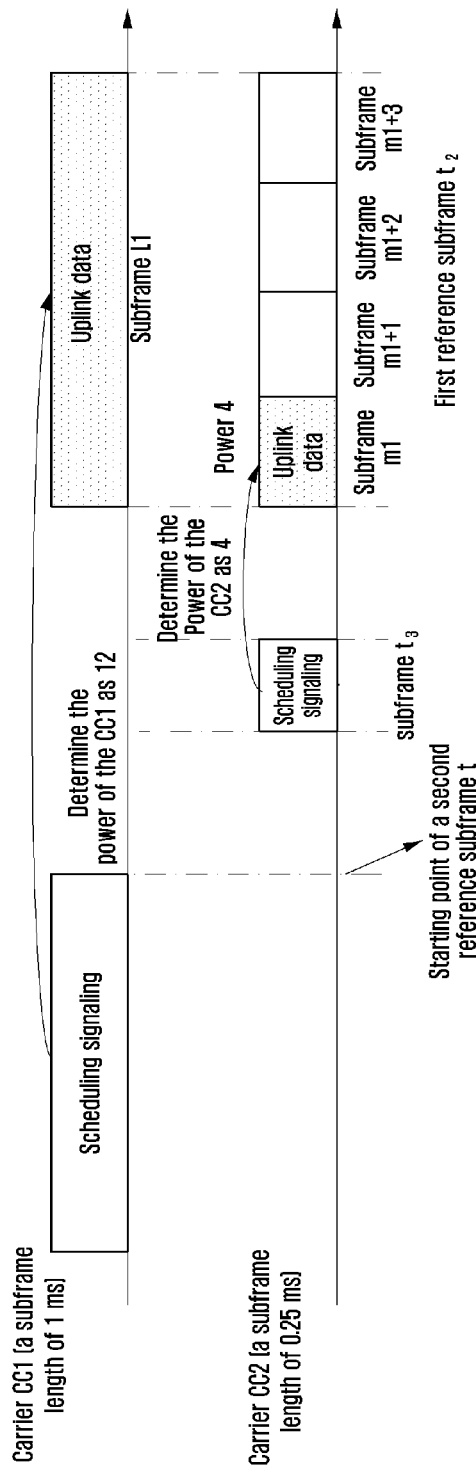
[Fig. 6]

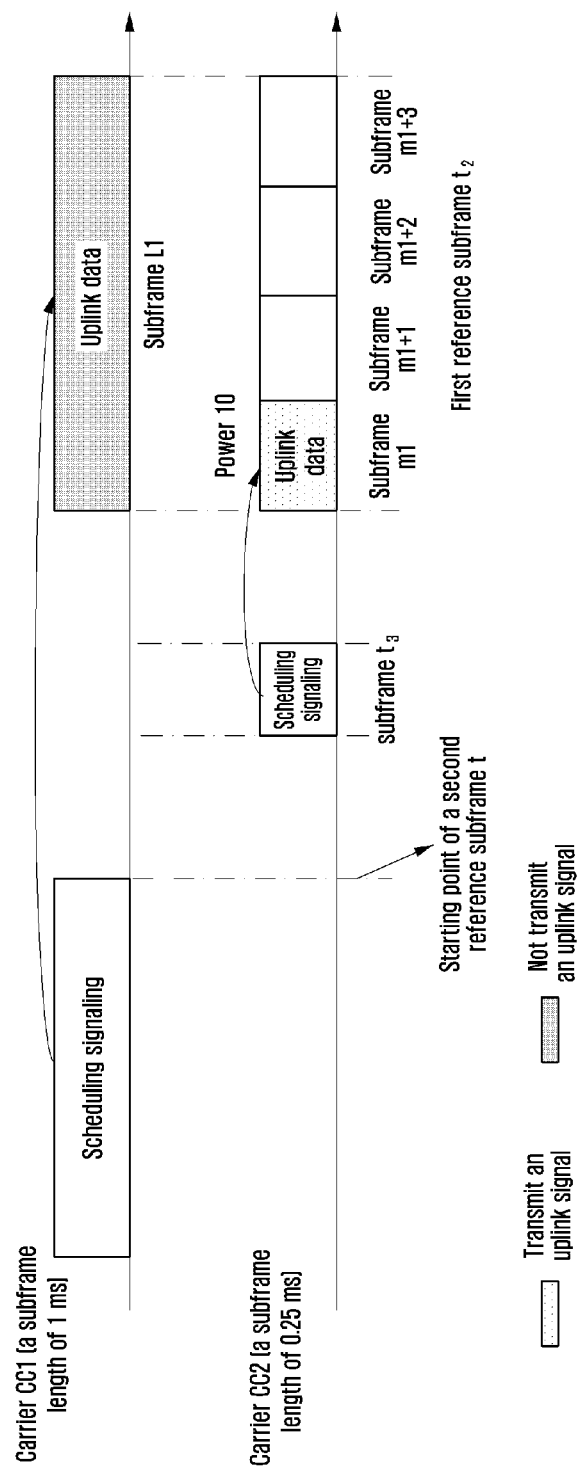
[Fig. 7]

[Fig. 8]
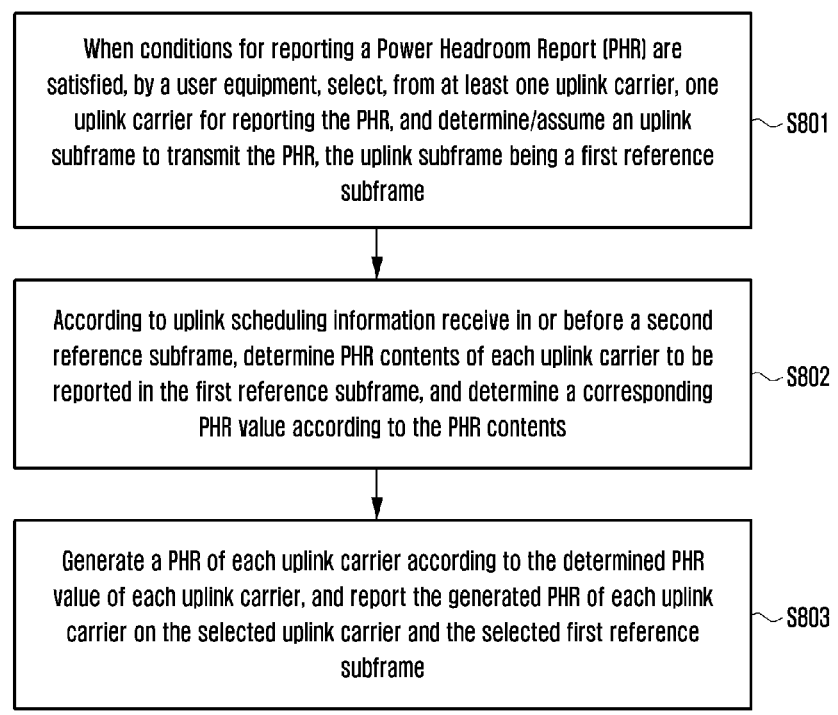

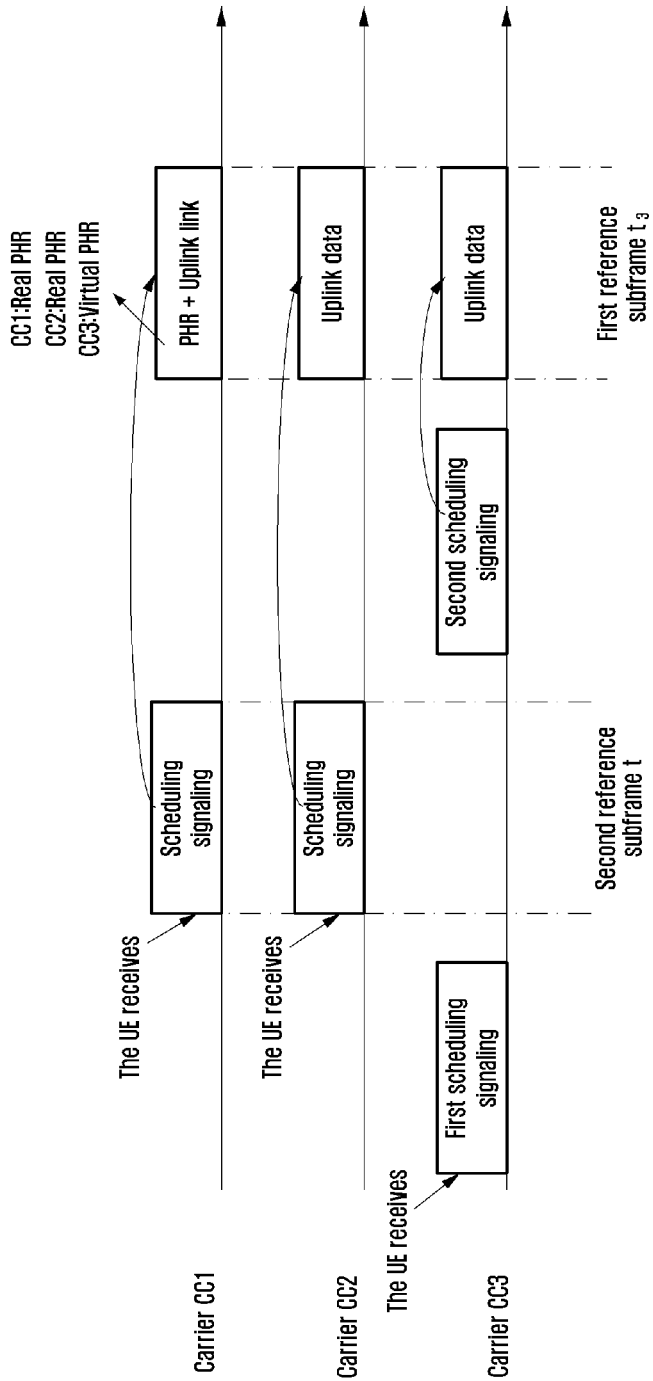
[Fig. 9]

[Fig. 10]
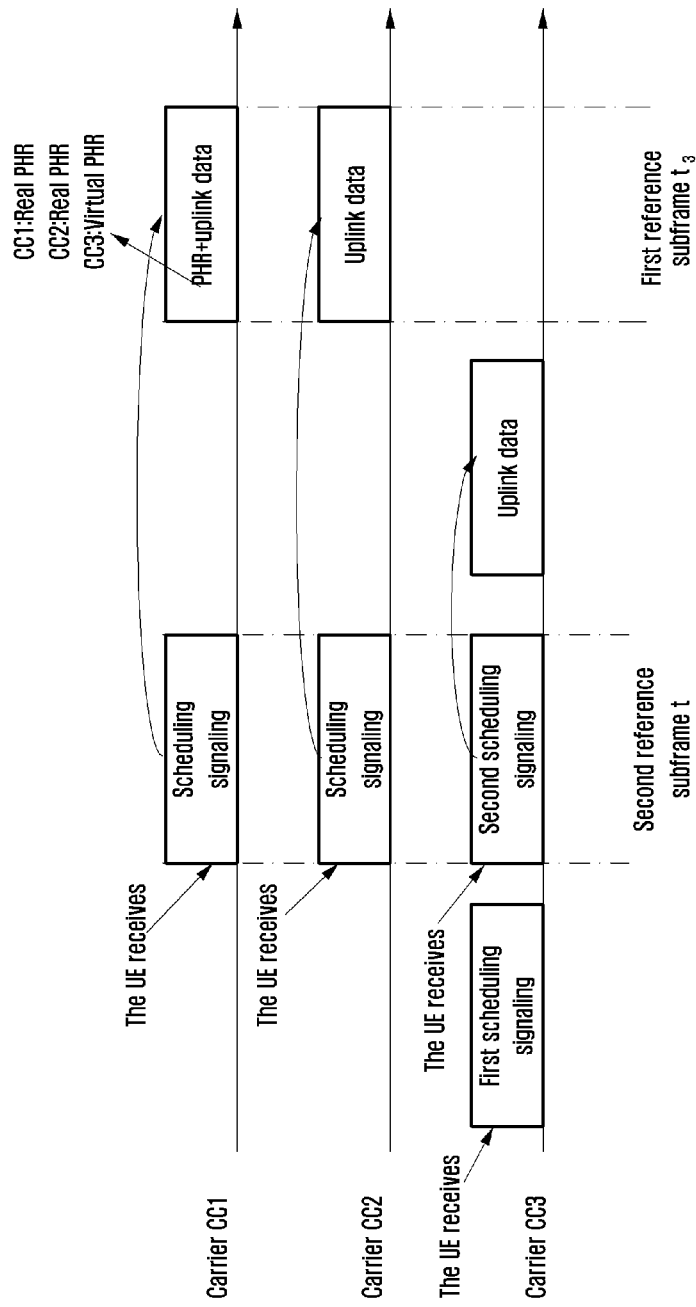

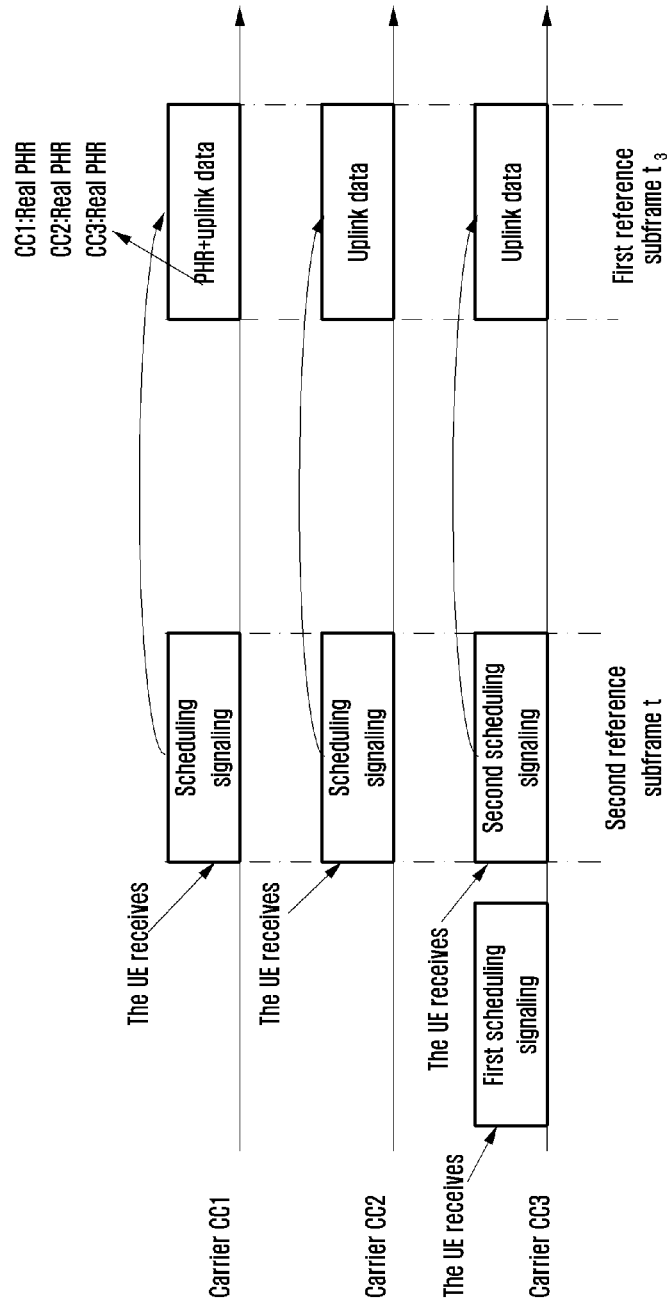
[Fig. 11]

[Fig. 12]
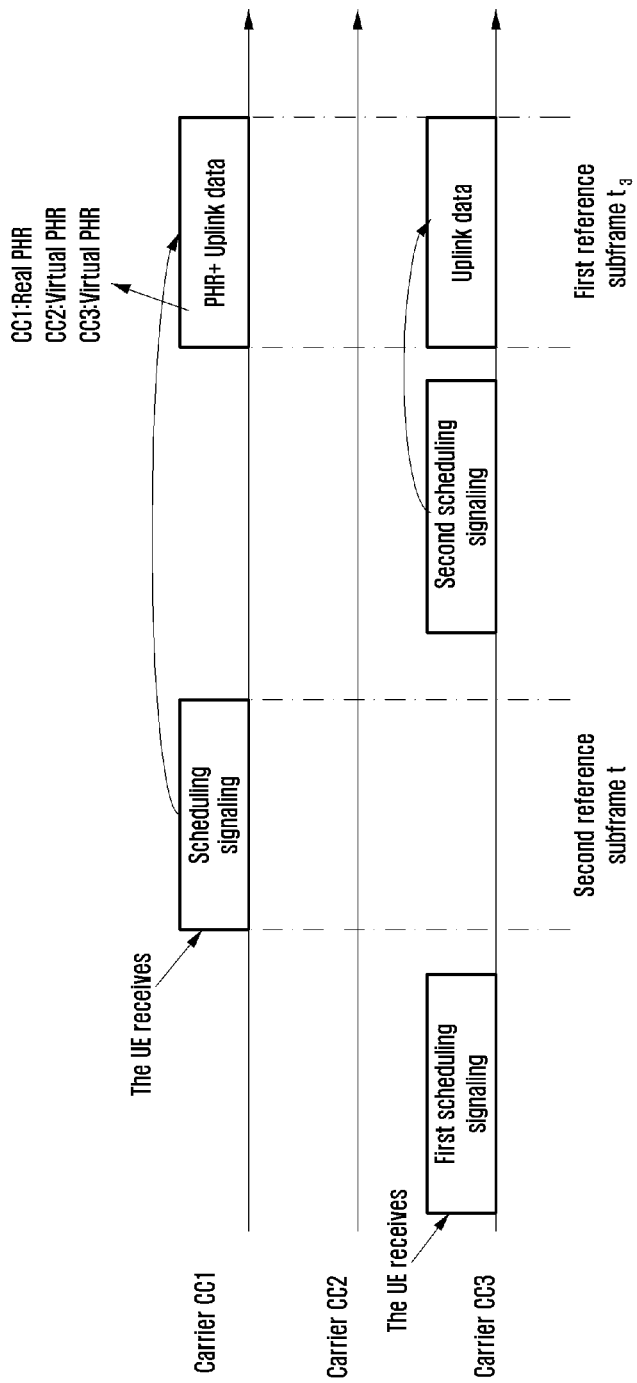

[Fig. 13]
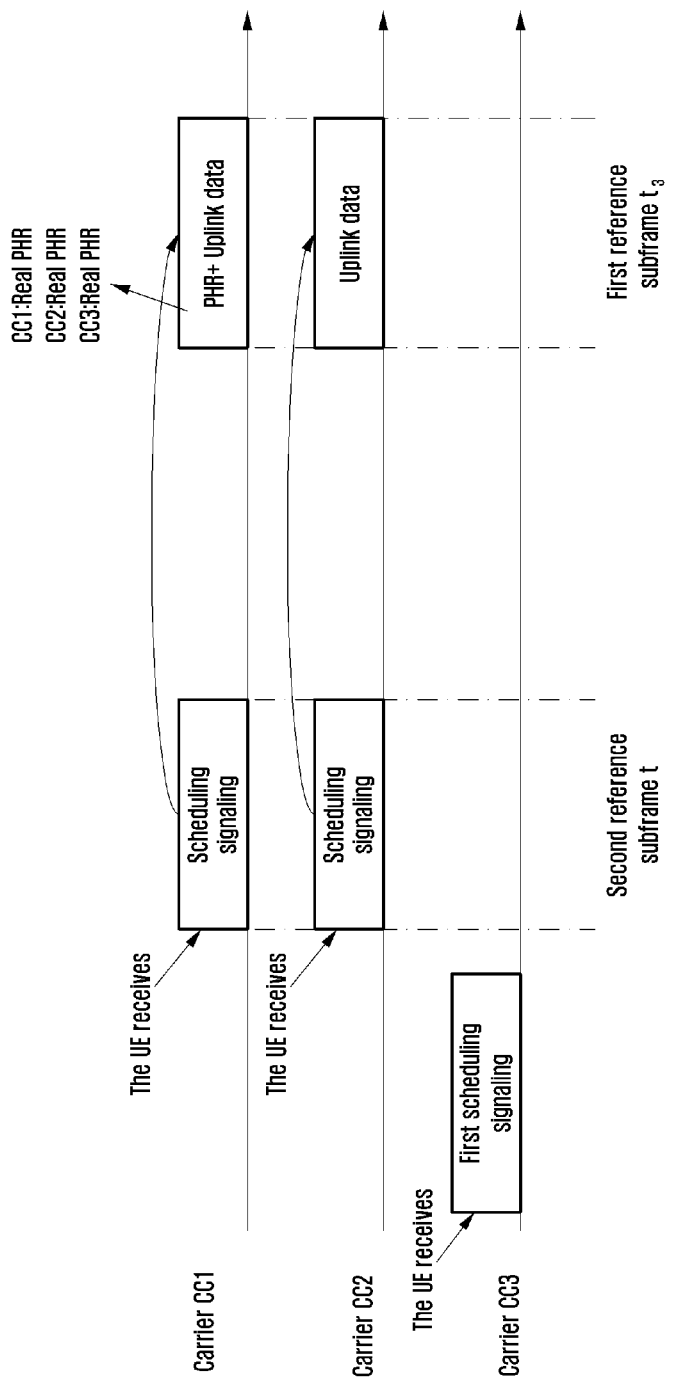

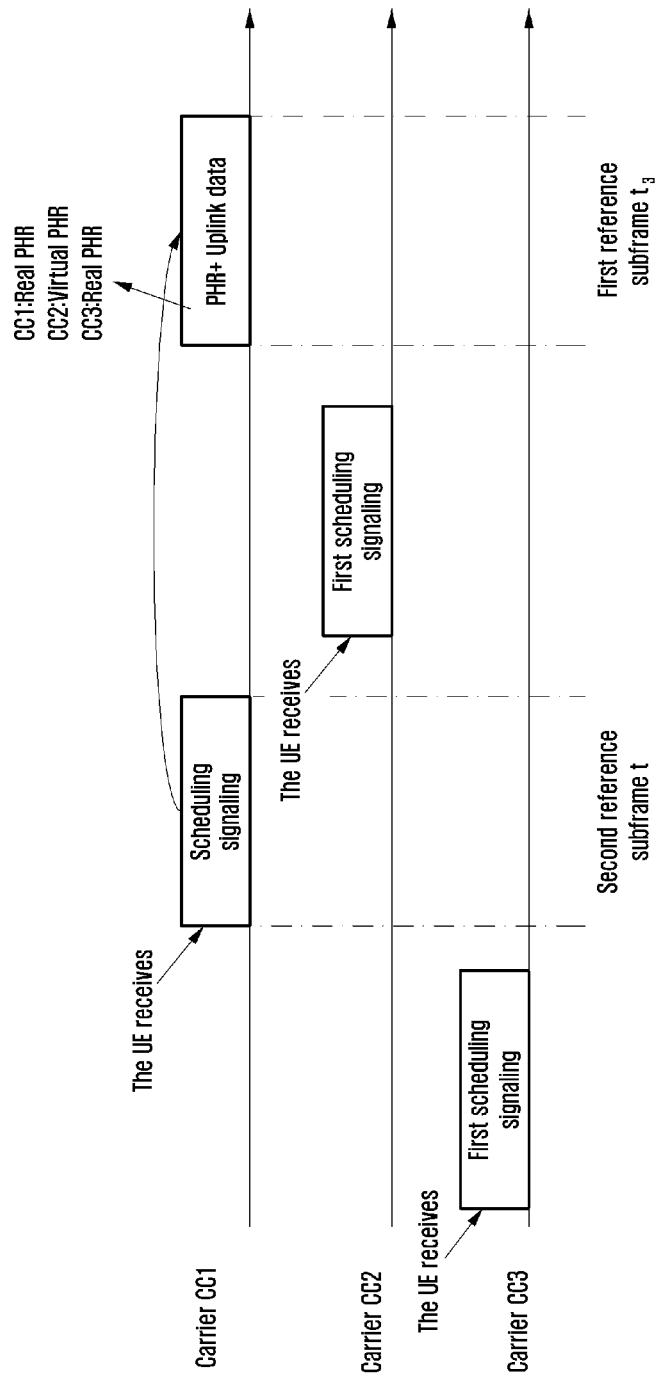

[Fig. 15]
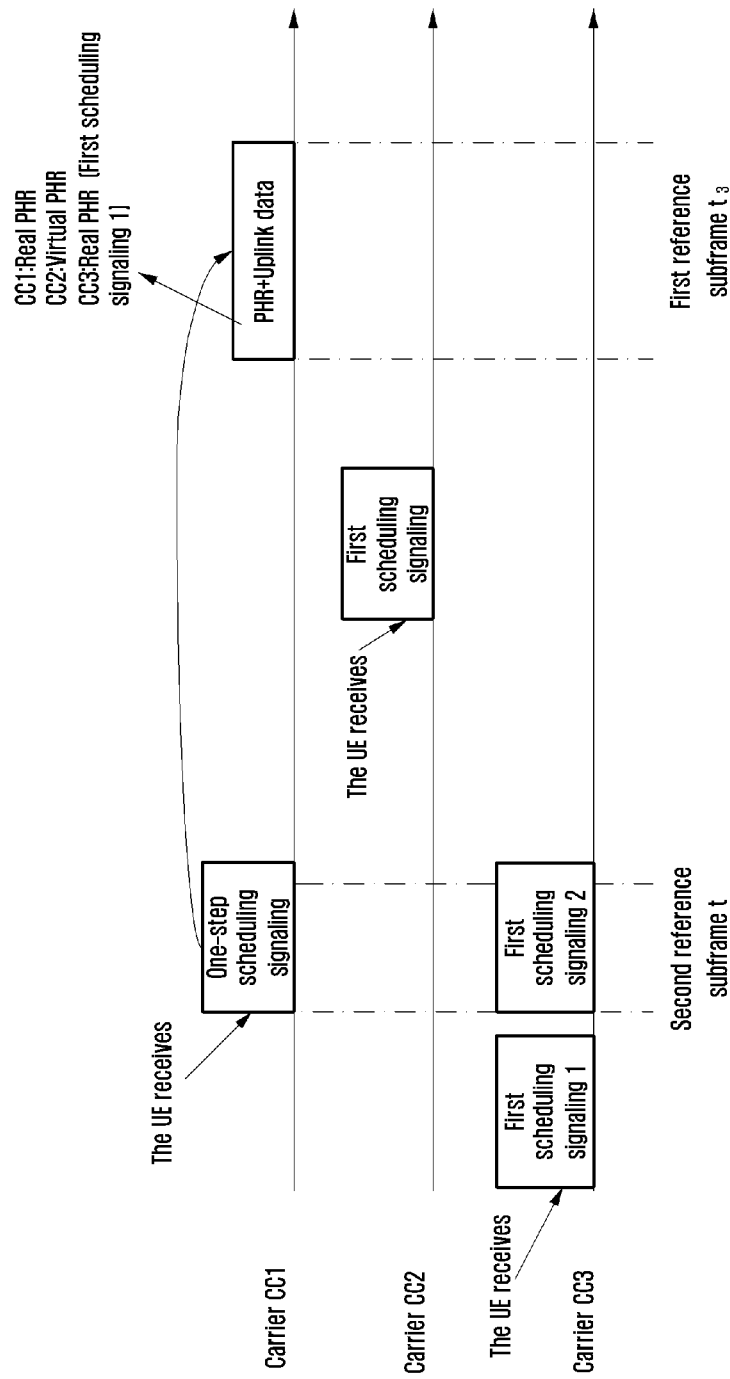

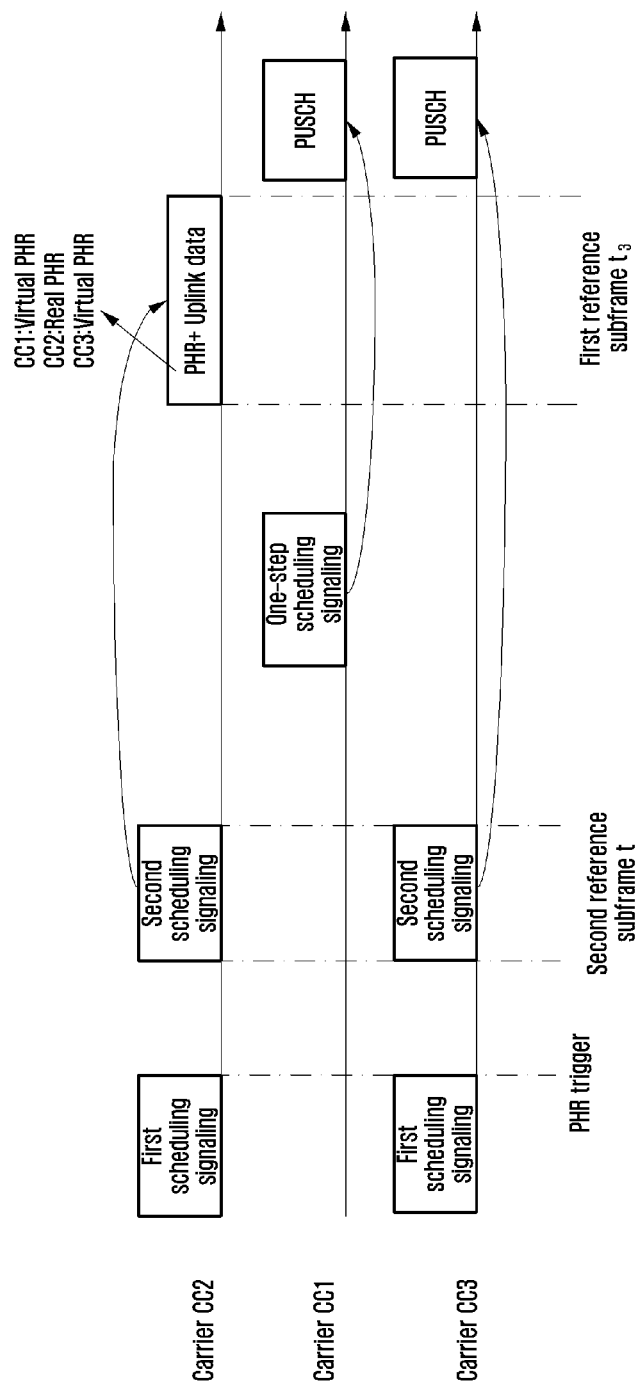

[Fig. 17]
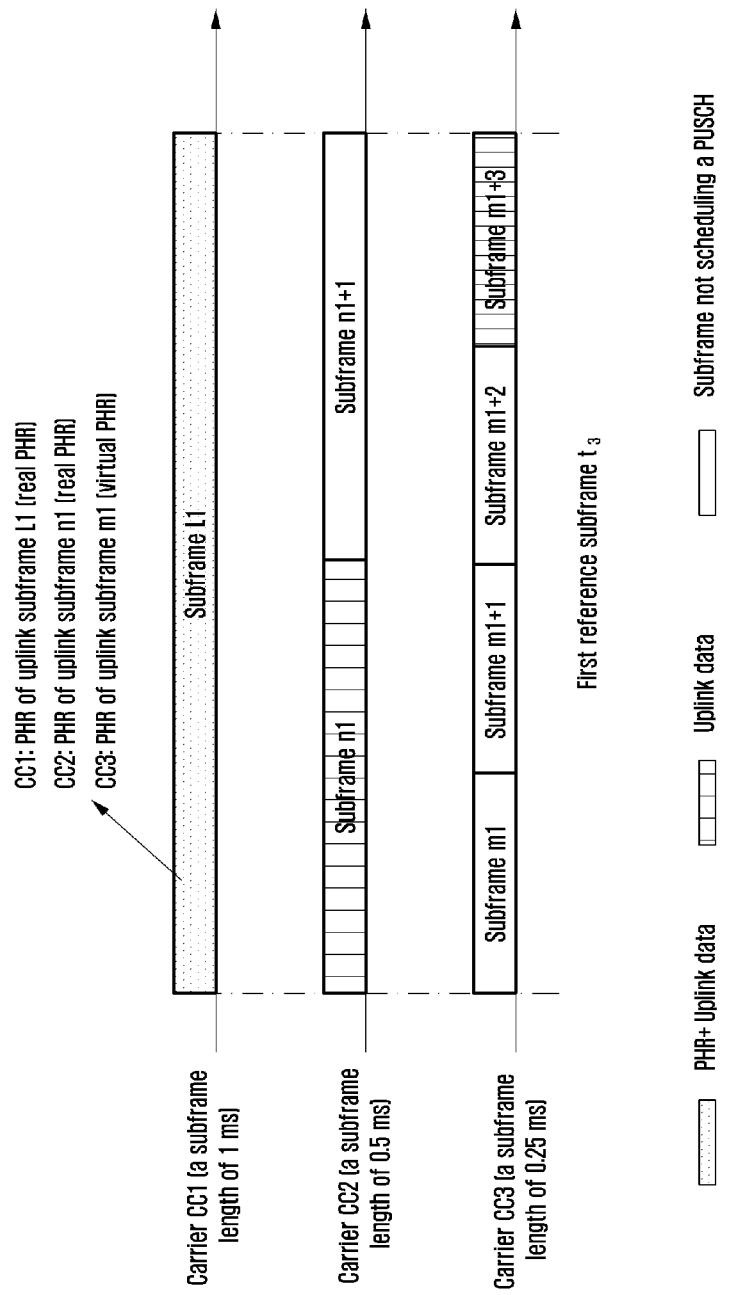

[Fig. 18]
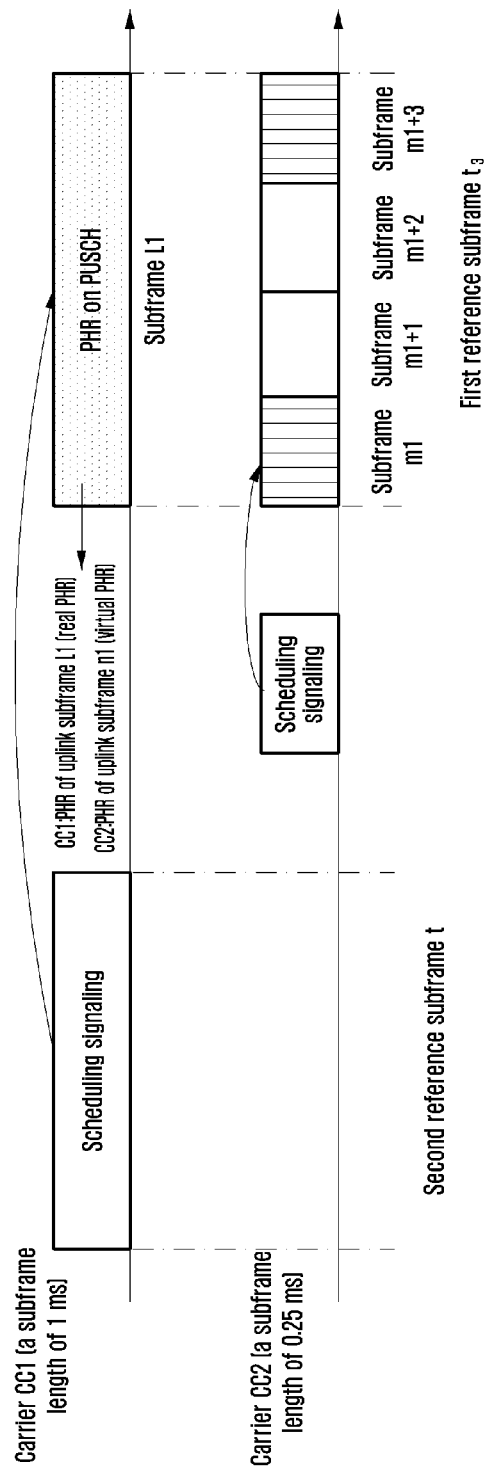

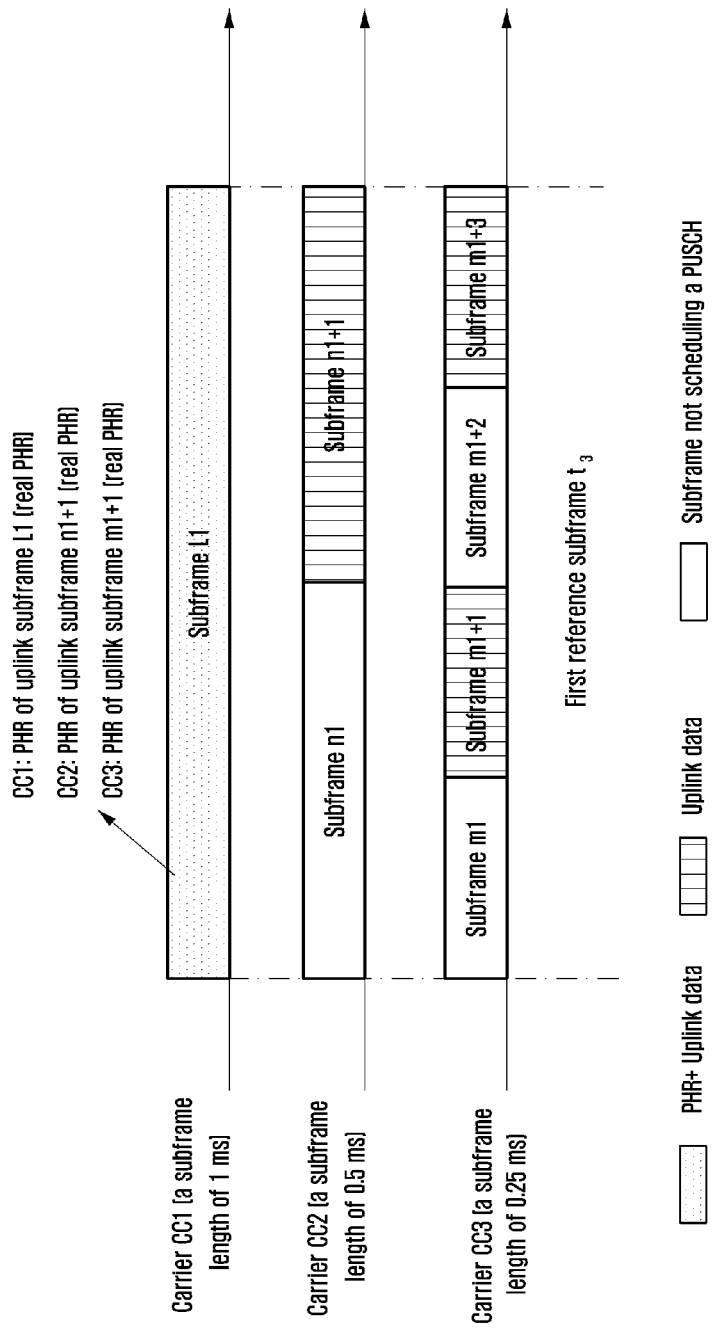
[Fig. 19]

[Fig. 20]
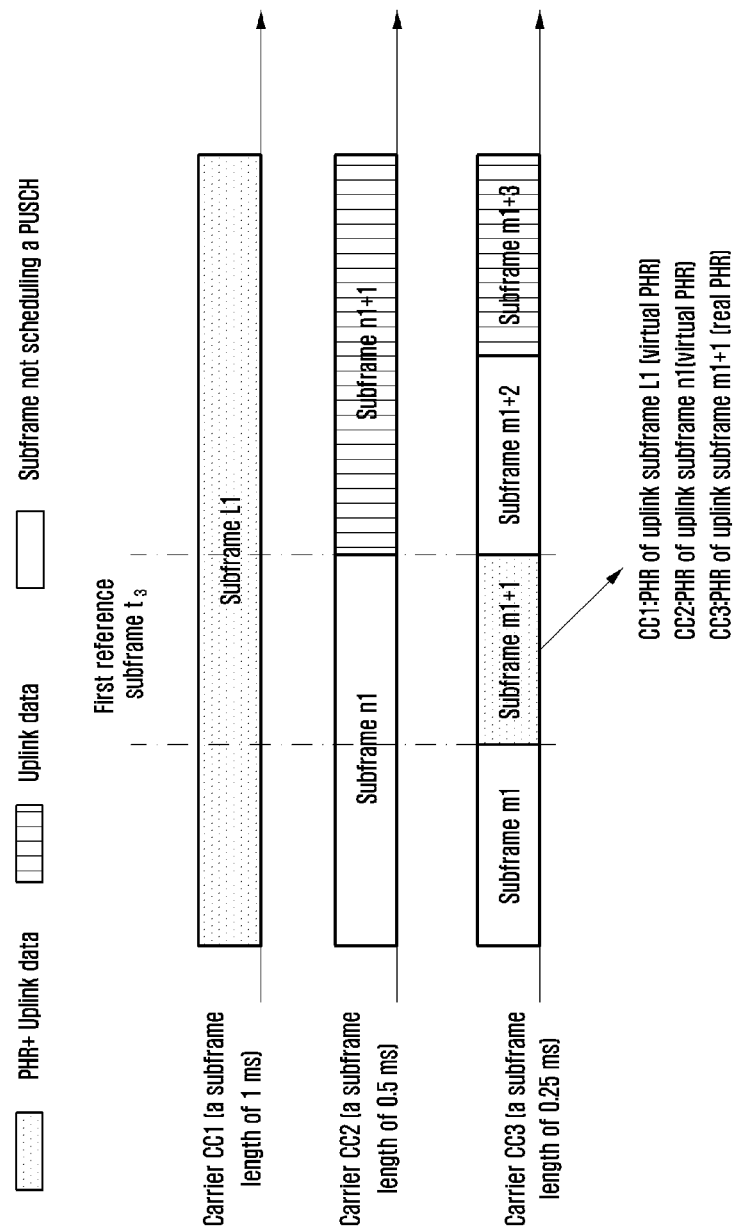

[Fig. 21]
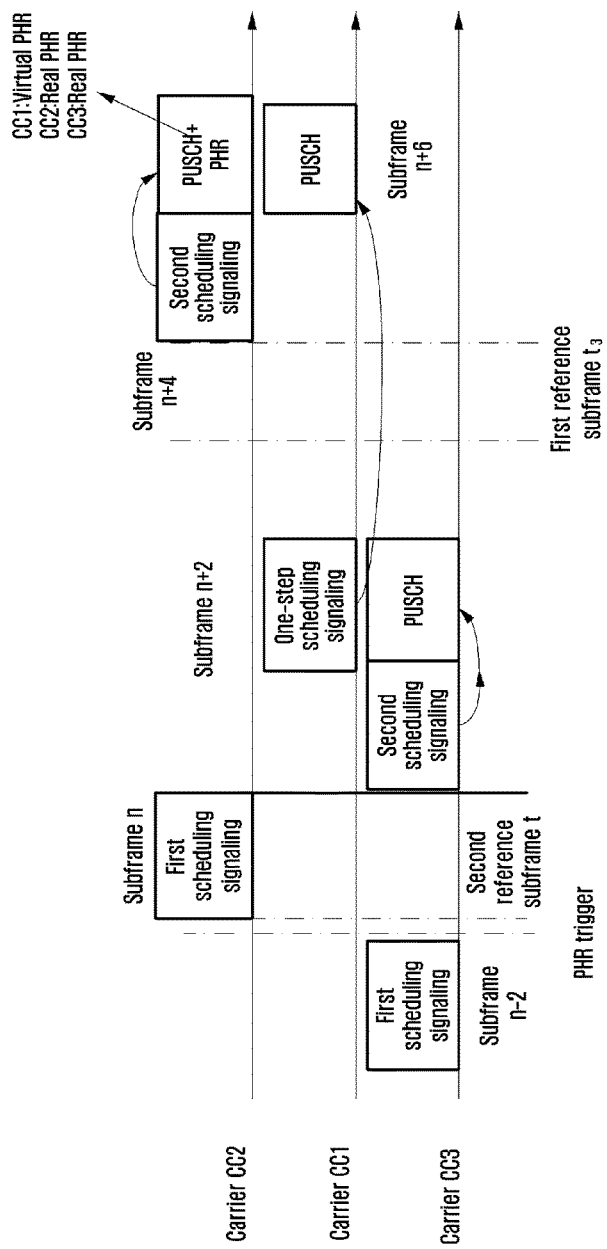
[Fig. 22]
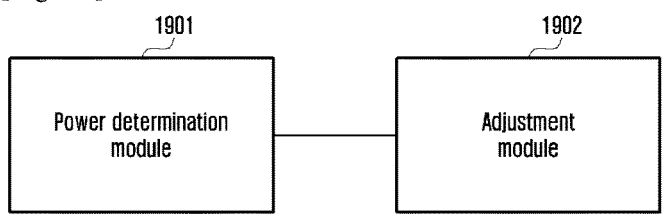
[Fig. 23]
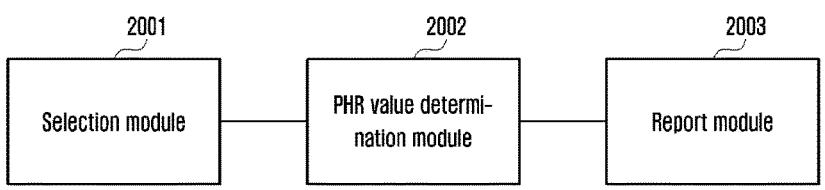

METHOD FOR REPORTING POWER HEADROOM AND CORRESPONDING USER EQUIPMENT

PRIORITY

This application is a National Phase Entry of PCT International Application No. PCT/KR2017/008281 which was filed on Aug. 1, 2017, and claims priority to Chinese Patent Application Nos. 201610622019.9, 201610796848.9, 201610887661.X, 201610941521.6, and 201710558248.3, which were filed on Aug. 1, 2016, Aug. 31, 2016, Oct. 11, 2016, Oct. 25, 2016, and Jul. 10, 2017, respectively, the content of each of which is incorporated herein by reference.

TECHNICAL FIELD

The present application relates to the technical field of mobile communications, and in particular to a method for reporting power headroom and a corresponding user equipment.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

With respect to a Licensed Assisted Access (LAA) system, it is urgent to provide a novel power adjustment method and PHR calculation and report method.

Solution to Problem

To overcome the technical problems or at least partially solve the technical problems, the following technical solutions are proposed.

An embodiment of the present invention provides a power allocation method, comprising the following steps of:

by a user equipment (UE), receiving uplink scheduling information, and determining a corresponding uplink transmit power on each uplink carrier according to the uplink scheduling information; and according to an actual maximum uplink transmit power in a first reference subframe of the UE and a predefined first priority, adjusting the determined uplink transmit power of each uplink carrier, and/or determining whether to transmit an uplink signal, the first reference subframe being a subframe which is determined according to the uplink scheduling information to transmit an uplink channel/signal.

An embodiment of the present invention provides a method for reporting power headroom, comprising the following steps of:

when conditions for reporting a Power Headroom Report (PHR) are satisfied, by a user equipment, selecting, from at least one uplink carrier, one uplink carrier for reporting the PHR, and determining an uplink subframe probably used to transmit PHR, the uplink subframe being a first reference subframe;

according to uplink scheduling information received in or before a second reference subframe, determining PHR contents of each uplink carrier to be reported in the first reference subframe, and determining a PHR value according to the PHR contents; and generating a PHR of each corresponding uplink carrier according to the determined PHR value of each uplink carrier, and reporting the generated PHR of each uplink carrier on the selected uplink carrier and the selected subframe.

Preferably, the second reference subframe is not prior to a subframe satisfying PHR trigger conditions, and the second reference subframe is before the first reference subframe; and, a time interval between the second reference subframe and the first reference subframe is not less than a minimum processing time required by the UE to generate the PHR.

Preferably, the second reference subframe is a subframe at a point in time when a Media Access Control (MAC) layer starts generating a PHR MAC control element; and/or, the second reference subframe is a subframe at a point in time when an MAC layer starts generating an MAC Protocol Data Unit (MAC PDU) packet containing a PHR MAC control element.

Preferably, if the PHR is reported on the uplink carrier by two-step scheduling, the first reference subframe probably used to transmit PHR is a subframe which is determined by a fixed offset with respect to the time of receiving a first scheduling signaling.

Preferably, if the PHR is reported on the uplink carrier by two-step scheduling, the first reference subframe probably used to transmit PHR is a subframe transmitting the PHR.

Preferably, the step of determining PHR contents of each uplink carrier to be reported in the first reference subframe comprises:

determining the PHR type of each corresponding uplink carrier, the PHR type comprising a real PHR or a virtual PHR;

wherein, the step of determining a PHR value according to the PHR contents, comprises:

calculating a PHR value according to the determined PHR type and/or a predefined time unit.

Preferably, the step of determining the PHR type of each corresponding uplink carrier comprises at least one of the following ways:

for an uplink carrier, the PHR type of the uplink carrier is a real PHR, if in the second reference subframe, it has been already determined that an uplink channel/signal on this uplink carrier is to be transmitted in the first reference subframe; for an uplink carrier, the PHR type of the uplink carrier is a virtual PHR, if in the second reference subframe, it has not been determined yet that an uplink channel/signal on this uplink carrier is to be transmitted in the first reference subframe; and for an uplink carrier, the PHR type of the uplink carrier is a virtual PHR, if in the second reference subframe, it has already been determined that an uplink channel/signal on this uplink carrier is not to be transmitted in the first reference subframe.

Preferably, the step of determining the PHR type of each corresponding uplink carrier comprises at least one of the following:

for an uplink carrier, the PHR type of the uplink carrier is a real PHR, if in the second reference subframe, it has already been determined that the uplink scheduling corresponding to the first reference subframe is one-step scheduling and the scheduling information indicates the uplink transmission in the first reference subframe; or otherwise, the PHR type of the uplink carrier is a virtual PHR.

Preferably, the step of determining the PHR type of each corresponding uplink carrier further comprises:

for an uplink carrier scheduled by the two-step scheduling, the PHR type of the uplink carrier is a virtual PHR, if the first scheduling signaling has been received in or before the second reference subframe, but the second scheduling signaling has not been received.

Preferably, the step of determining the PHR type of each corresponding uplink carrier comprises at least one of the following:

for an uplink carrier, the PHR type of the uplink carrier is a real PHR, if in the second reference subframe, it has already been determined that an uplink channel/signal on this uplink carrier is to be transmitted in the first reference subframe;

for an uplink carrier, the PHR type of the uplink carrier is a virtual PHR, if in the second reference subframe, it has already been determined that an uplink channel/signal on this uplink carrier is not to be transmitted in the first reference subframe; and for an uplink carrier, the PHR type of the uplink carrier is a real PHR, if in the second reference subframe, it has already been determined that an uplink channel/signal on this uplink carrier is to be transmitted in the first reference subframe or for an uplink channel/signal is possibly to be transmitted in the first reference subframe.

Preferably, the step of determining the PHR type of each corresponding uplink carrier comprises at least one of the following situations:

for an uplink carrier by one-step scheduling, the PHR type of the uplink carrier is a virtual PHR, if in or before the second reference subframe, uplink scheduling information which schedules the uplink transmission to be transmitted on the uplink carrier in the first reference subframe is not received or the received uplink scheduling information indicates the uplink transmission in a subframe other than the first reference subframe; and, if the uplink scheduling information has been received in or before the second reference subframe, and the uplink scheduling information which schedules the uplink transmission to be transmitted on the uplink carrier in the first reference subframe, the PHR type of the uplink carrier is a real PHR; and for an uplink carrier by two-step scheduling, the PHR type of the uplink carrier is a virtual PHR, if in or before the second reference subframe, a second scheduling signaling has been received, and the subframe to transmit the uplink transmission on the uplink carrier triggered by the second scheduling signaling is not the first reference subframe; and, if a second scheduling signaling has been received in or before the second reference subframe, and the subframe to transmit the uplink transmission on the uplink carrier triggered by the second scheduling signaling is the first reference subframe, the PHR type of the uplink carrier is a real PHR.

Preferably, for an uplink carrier scheduled by the two-step scheduling, if in or before the second reference subframe, a first scheduling signaling has been received, but a second scheduling signaling has not been received, the step of determining the PHR type of each corresponding uplink carrier comprises at least one of the following situations:

if the first scheduling signaling indicates the an uplink channel/signal to be transmitted in a subframe other than the first reference subframe, the PHR type of the uplink carrier is a virtual PHR;

if the first reference subframe has been out of a valid time window of the first scheduling signaling, the PHR type of the uplink carrier is a virtual PHR;

if the time interval between the first reference subframe and the subframe in which the first scheduling signaling is received is less than a predefined threshold X, the PHR type of the uplink carrier is a virtual PHR;

if the possibility of transmitting an uplink channel/signal in the first reference subframe cannot be excluded by the first scheduling signaling, the PHR type of the uplink carrier is a real PHR; and if the first scheduling signaling has not been received in or before the second reference subframe, the PHR type of the uplink carrier is a virtual PHR.

Preferably, for an uplink carrier scheduled by the two-step scheduling, if a first scheduling signaling has been received in or before the second reference subframe, the step of determining the PHR type of each corresponding uplink carrier comprises at least one of the following situations:

if the first scheduling signaling indicates an uplink channel/signal to be transmitted in a subframe other than the first reference subframe, the PHR type of the uplink carrier is a virtual PHR;

if the first reference subframe is out of a valid time window of the first scheduling signaling, the PHR type of the uplink carrier is a virtual PHR;

if the time interval between the first reference subframe and the subframe in which the first scheduling signaling is received is less than a predefined threshold X, the PHR type of the uplink carrier is a virtual PHR;

if the possibility of transmitting an uplink channel/signal in the first reference subframe cannot be excluded by the first scheduling signaling, the PHR type of the uplink carrier is a real PHR.

Preferably, the step of determining the PHR type of each corresponding uplink carrier comprises:

if both a signaling for two-step scheduling and a signaling for one-step scheduling has been received in or before the second reference subframe, and if the signaling for one-step scheduling schedules the uplink transmission of a first subframe, calculating a real PHR according to the one-step scheduling signaling; if the signaling for one-step scheduling does not schedule the uplink transmission of the first uplink subframe but the UE has received a first scheduling signaling for two-step scheduling, and the first reference subframe is within a valid time window of the first scheduling signaling, calculating, by the UE, a real PHR according to the first scheduling signaling; and/or, if a multiple of first scheduling signalings have been received in or before the second reference subframe, and the second scheduling signalings corresponding to the first scheduling signalings have been not received, then, within the valid time window of the first scheduling signalings, the PHR type of the corresponding uplink carrier is a real PHR. Furthermore, the UE selects, according to a predefined rule, one of the first scheduling signalings and then determine the PHR type is a real PHR, selecting the first received first scheduling signalings as a reference, and calculating a real PHR, or, selecting the last received first scheduling signalings as a reference, and calculating a real PHR, or, if all the first scheduling signalings are received in a same subframe, selecting a first scheduling signaling with a lowest PDCCH/EPDCCH search space index number as a reference, and calculating a real PHR.

Preferably, the step of calculating a PHR value according to the determined PHR type and/or a predefined time unit comprises:

when it is selected to transmit PHRs on an uplink carrier with a longer Transmission Time Interval (TTI) length, the PHR of other uplink carriers with relatively shorter TTI length is calculated based on the first shorter TTI within the first reference subframe.

Preferably, the step of calculating a PHR value according to the determined PHR type and/or a predefined time unit comprises at least one of the following situations:

when it is selected to transmit PHRs on an uplink carrier with a longer subframe duration, the PHR of other uplink carriers with relatively shorter TTI is calculated based on the first scheduled shorter TTI within the first reference subframe; and if there is no shorter subframe is scheduled within the first reference subframe, reporting a PHR of the first shorter TTI within the first reference subframe, or reporting a PHR of any shorter TTI within the first reference subframe, and/or reporting an index of a TTI.

Another embodiment of the present invention provides a user equipment (UE) for power allocation, comprising:

a powder determination module, configured to receive uplink scheduling information, and determine a corresponding uplink transmit power on each uplink carrier according to the uplink scheduling information; and an adjustment module, configured to, according to an actual maximum uplink transmit power of a first reference subframe of the UE and a predefined first priority, adjust the determined uplink transmit power of each uplink carrier, and/or determine whether to transmit an uplink signal, the first reference subframe being a subframe which is determined according to the uplink scheduling information to transmit an uplink channel/signal.

Still another embodiment of the present invention provides a user equipment (UE) for reporting power headroom, comprising:

a selection module, configured to, when conditions for reporting a Power Headroom Report (PHR) are satisfied, select, from at least one uplink carrier, one uplink carrier for reporting the PHR, and determine or assume an uplink subframe to transmit the PHR, the uplink subframe being a first reference subframe;

a PHR value determination module, configured to, according to uplink scheduling information received in or before a second reference subframe, determine PHR contents of each uplink carrier to be reported on the first reference subframe, and determine a corresponding PHR value according to the PHR contents; or, determine the PHR contents of the uplink carrier, according to whether the carrier is a carrier adopting two-step scheduling;

a report module, configured to generate a PHR of each uplink carrier according to the determined PHR value of each uplink carrier, and report the generated PHR of each uplink carrier on the selected uplink carrier and in the selected first reference subframe.

In an embodiment of the present invention, in view of adopting subframes with different lengths on more than one carrier of a UE in a communication system, a power allocation method is provided, in which the UE determines a corresponding uplink transmit power on each uplink carrier according to the uplink scheduling information, and adjusts, according to the predicted maximum uplink transmit power of the user equipment and a predefined first priority, the transmit power of each uplink carrier and/or determines whether to transmit an uplink signal or drop an uplink signal. Hence, the effective allocation of uplink power of the UE is realized under limited uplink processing time, and the uplink scheduling efficiency of the UE is improved. As a result, the overall network efficiency is improved.

In another embodiment of the present invention, a UE selects, from at least one uplink carrier, one uplink carrier for reporting a PHR, and determines an uplink subframe to transmit the PHR, the uplink subframe being a first reference subframe; according to uplink scheduling information received in or before a second reference subframe or according to whether the carrier is scheduled by two-step scheduling, PHR contents of the uplink carrier are determined, and PHR contents of each uplink carrier to be reported in the first reference subframe are determined; and, a PHR of each uplink carrier is generated according to the PHR contents, and the generated PHR of each uplink carrier is reported on the selected uplink carrier and in the determined first reference subframe. In a case where the subframes are with different lengths on a multiple carriers of the UE in the communication system, a method for reporting a PHR is provided. It is ensured that the UE can perform efficient power headroom calculation under limited uplink processing time, so that the accuracy of reporting the PHR is improved. As a result, the uplink scheduling efficiency of the UE is improved.

The above solutions as provided in the present invention just make minor modifications to the existing systems, and hence will not influence the system compatibility. Moreover, the implementations of these solutions as provided are both simple and highly efficient.

Additional aspects and advantages of the present invention will be partially appreciated and become apparent from the description below, or will be well learned from the practices of the present invention.

Advantageous Effects of Invention

According to the embodiments of the present invention, procedures of reporting power headroom report (PHR) and corresponding scheduling uplink resources can be enhanced.

According to other embodiments of the present invention, adjusting transmit power for different carriers with different TTI lengths can be efficiently performed in a 5G system.

BRIEF DESCRIPTION OF DRAWINGS

The above and/or additional aspects and advantageous of the present invention will become apparent and be more readily appreciated from the following descriptions of embodiments, with reference to the accompanying drawings, in which:

FIG. 1 is a schematic diagram of a combined arrangement scenario of licensed frequency bands and unlicensed frequency bands in the prior art;

FIG. 2 is a flowchart of a power allocation method according to Embodiment 1 of the present application;

FIG. 3 is a first schematic diagram of a power adjustment method according to Embodiment 1 of the present application;

FIG. 4 is a second schematic diagram of the power adjustment method according to Embodiment 1 of the present application;

FIG. 5 is a third schematic diagram of the power adjustment method according to Embodiment 1 of the present application;

FIG. 6 is a fourth schematic diagram of the power adjustment method according to Embodiment 1 of the present application;

FIG. 7 is a fifth schematic diagram of the power adjustment method according to Embodiment 1 of the present application;

FIG. 8 is a flowchart of a method for reporting power headroom according to Embodiment 2 of the present application;

FIG. 9 is a first schematic diagram of a PHR calculation method according to Embodiment 2 of the present application;

FIG. 10 is a second schematic diagram of the PHR calculation method according to Embodiment 2 of the present application;

FIG. 11 is a third schematic diagram of the PHR calculation method according to Embodiment 2 of the present application;

FIG. 12 is a fourth schematic diagram of the PHR calculation method according to Embodiment 2 of the present application;

FIG. 13 is a fifth schematic diagram of the PHR calculation method according to Embodiment 2 of the present application;

FIG. 14 is a sixth schematic diagram of the PHR calculation method according to Embodiment 2 of the present application;

FIG. 15 is a seventh schematic diagram of the PHR calculation method according to Embodiment 2 of the present application;

FIG. 16 is an eighth schematic diagram of the PHR calculation method according to Embodiment 2 of the present application;

FIG. 17 is a first schematic diagram of a PHR calculation method according to Embodiment 3 of the present application;

FIG. 18 is a second schematic diagram of the PHR calculation method according to Embodiment 3 of the present application;

FIG. 19 is a third schematic diagram of the PHR calculation method according to Embodiment 3 of the present application;

FIG. 20 is a fourth schematic diagram of the PHR calculation method according to Embodiment 3 of the present application;

FIG. 21 is a ninth schematic diagram of the PHR calculation method according to Embodiment 2 of the present application;

FIG. 22 is a structural diagram of a user equipment for power allocation according to Embodiment 4 of the present application; and FIG. 23 is a structural diagram of a user equipment for reporting power headroom according to Embodiment 5 of the present application.

MODE FOR THE INVENTION

With the increasingly sharp contradiction between the burst of users' demands for high-bandwidth wireless services and the scarcity of frequency spectrum resources, mobile operators begin to consider license-free frequency bands (also referred to as unlicensed frequency bands) as supplements for licensed frequency bands. Therefore, studying the deployment of a Long Term Evolution (LTE) network on an unlicensed frequency band has been put on the agenda. The 3GPP has already began to study on how to effectively improve the utilization rate of the whole frequency spectrum through the effective carrier aggregation of the unlicensed frequency bands and the licensed frequency bands, without significantly influencing other technologies of the unlicensed frequency bands. FIG. 1 is a schematic diagram of a combined arrangement scenario of licensed frequency bands and unlicensed frequency bands.

An unlicensed frequency band is generally allocated for some other purposes, for example, radar or Wireless Fidelity (WiFi) of 802.11 series. Thus, the interference level on the unlicensed frequency band is uncertain, and consequently, it is generally difficult to ensure the Quality of Service (QoS) of the LTE transmission. Despite this, the unlicensed frequency band can still be used for data transmission that requires a low QoS. Here, an LTE system deployed on the unlicensed frequency band is called a Licensed-Assisted Access (LAA) system. How to avoid the mutual interference between the LAA system and a radar, WiFi or other wireless systems on the unlicensed frequency band is a critical issue.

A Carrier Sensing (CS) is a collision avoidance mechanism universally adapted on the unlicensed frequency band. A mobile station has to detect a wireless channel before transmitting signals, and can occupy the wireless channel to transmit signals only when detecting that the wireless channel is idle. This mechanism is called Listen Before Talk (LBT). The LAA system also needs to follow the LBT mechanism to ensure less interference to other signals. In the LAA system, the uplink transmission of a User Equipment (UE) is still scheduled by a base station. However, since the base station and the UE are located at different geographical locations and suffer different interferences, the base station cannot predict whether the UE can perform transmission in a scheduled subframe when the base station schedules the UE. In order to increase the transmission probability of the UE on the scheduled uplink subframe, the base station can adopt two-step scheduling, so as to trigger the UE to transmit an uplink when it is more advantageous for the UE to occupy a channel. For example, the base station can transmit a first scheduling signaling at moment $t_0$ in order to indicate resource information for the uplink transmission of the UE, for example, Physical Resource Blocks (PRBs), a Modulation and Coding Scheme (MCS) and the like. Upon receiving the first scheduling signaling, the UE can start preparing a corresponding uplink signal/channel, but the UE does not execute the uplink transmission. The base station can transmit a second scheduling signaling at moment $t_1$ in order to trigger the UE to perform the uplink transmission on the indicated or predefined subframe (at moment $t_2$), and the transmitted uplink signal/channel is the uplink signal/channel prepared by the UE upon receiving the first scheduling signaling. To ensure that the UE has enough time to prepare the uplink signal/channel, the time span from the moment $t_0$ of receiving the first scheduling signaling to the moment $t_2$ of eventually transmitting the uplink signal needs to satisfy a minimum time delay $\Delta t$. For example, in accordance with the time delay of the LTE, $\Delta t=4$ ms. Since the second scheduling signaling is merely for triggering, the time span from the moment t1 of receiving the second scheduling signaling to the moment $t_2$ of eventually transmitting the uplink signal needs to satisfy a minimum time delay $\Delta t'$ which can be less than $\Delta t$. For example, $\Delta t'$ is 1 ms or 2 ms.

When the UE operates in a carrier aggregation mode, the maximum uplink transmit power is related to the number of simultaneously transmitted uplink carriers. It is not hard to see, when the base station adopts the two-step scheduling, the time of receiving the first/second scheduling signaling by different uplink carriers may be different, but the time for the UE to eventually transmit uplink signals on these uplink carriers is the same. In an existing LTE system, since there is only one-step uplink scheduling and the time delay from the uplink scheduling to the uplink transmission is fixed, the UE can determine, in a subframe satisfying the minimum time delay, for example, in a subframe n−4, whether a corresponding uplink signal is transmitted on different uplink carriers in an uplink subframe n, so that the maximum transmit power of the subframe n can be determined on the subframe n−4, and the power allocation and adjustment can be performed on each uplink carrier which is to transmit the uplink signal in the subframe n. In the LAA system, if the base station adopts the two-step scheduling, regardless of when the UE receives the first scheduling signaling, the UE can determine how many uplink carriers to be simultaneously transmitted in the uplink subframe n only when receiving the second scheduling signaling, so that the maximum transmit power of the uplink subframe n is determined. In accordance with the method for the existing LTE system, the UE is unable to adjust the power of each carrier in time according to the second scheduling signaling. Furthermore, in the LTE system, in order to support services having low-latency requirements, shorter subframes are designed. For example, instead of the 1 ms subframe duration in the conventional LTE, a time length of half a millisecond or less is used as a scheduling unit (TTI). Generally, the shorter the TTI length is, the shorter the minimum time delay from the uplink scheduling to the uplink transmission is. For example, the time delay under a TTI of 0.5 ms is half of 1 ms. Then, within a same time window, it is likely to transmit signals with different TTI lengths on each uplink carrier, and the time delay from the uplink scheduling for scheduling these signal to the uplink transmission is also different. For example, on an uplink carrier CC1, a scheduling signaling from a subframe n schedules the uplink transmission in a subframe n+4, and the TTI length is 1 ms; while on an uplink carrier CC2, a scheduling signaling from a subframe n+2 schedules the uplink transmission on the subframe n+4, and the TTI length is 0.5 ms. Then, in accordance with the method for the existing LTE system, the UE is unable to adjust the power of uplink carriers on CC1 in time according to the scheduling signaling on the uplink carrier CC2. Similarly, in a 5G system, it is also likely to transmit signals with different TTI lengths on different carriers. For example, one carrier is an LTE carrier having a subcarrier spacing of 15 KHz and a TTI length of 1 ms, while another carrier is a 5G carrier having a subcarrier spacing of 30 KHz and a TTI length of 0.5 ms. Then, the power adjustment suffers from a similar problem. Therefore, it is urgent to provide a novel power adjustment method.

In addition, in the LTE system, in order to provide a reference for the base station in scheduling uplink resources, the UE reports the remaining power headroom in a specified scheduling situation by using a Power Headroom Report (PHR). When the UE needs to report PHRs, that is, when the trigger conditions for reporting the PHRs are satisfied, the UE needs to report PHRs of all activated uplink carriers. Wherein, the UE needs to determine in which uplink subframe the PHRs (including PHRs of all activated uplink carriers) are to be transmitted. For example, if the UE is scheduled for uplink transmission on an uplink subframe n, and this uplink transmission is sufficient to bear the PHRs and is an initial transmission, the UE can transmit the PHRs on this uplink subframe n. The UE needs to calculate, according to the uplink transmission situations of all activated carriers in the uplink subframe n, a PHR of each carrier and then generate a PHR report. A specific method for calculating a PHR in the existing LTE system can be obtained by referring to the formulae and descriptions thereof in 5.1.1.2 in TS 36.213. Since the generation of the PHR report takes certain processing time, UE needs to calculate, before the uplink subframe n, for example, starting from the subframe n−4 in which a uplink scheduling signaling for scheduling the uplink subframe n has been received, the transmit power of the uplink subframe n according to the uplink scheduling signaling, and then determine the PHR type according to whether the uplink scheduling signaling is received. For example, if the UE has not received a signaling for scheduling the UE to transmit an uplink in a subframe n on a carrier $C_i$, the PHR of the carrier $C_i$ is a virtual PHR; or otherwise, the PHR of the carrier $C_i$ is a real PHR. The UE generates a PHR report after determining the PHR type and calculating the PHR value. If the base station schedules the two-step scheduling for an uplink carrier, it is possible that the carrier determined by the UE to transmit the PHR report is scheduled by the one-step scheduling in the conventional LTE, for example, the carrier is a licensed carrier, but carriers contained in the PHR report are scheduled by the two-step scheduling. It is also possible that the carrier determined by the UE to transmit the PHR report is scheduled by the two-step scheduling, but the time of receiving a two-step scheduling signaling by each carrier contained in the PHR report is different, or the minimum time delay from uplink scheduling to uplink transmission is different for a multiple of carriers contained in the PHR report. Therefore, it is urgent to provide a novel PHR calculation and report method.

Embodiments of the present invention will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present invention and should not be regarded as any limitations thereto.

Embodiment 1

In this embodiment, a specific way of determining an actual transmit power of each uplink transmitting carrier to transmit an uplink signal is as follows.

A UE adjusts the transmit power of each uplink transmitting carrier according to the received uplink scheduling information and/or the predicted maximum uplink transmit power of the user equipment (UE), and adjusts the power on the corresponding uplink carrier and/or determines whether to drop transmitting an uplink signal according to the maximum uplink transmit power during the actual transmission and a predefined priority criterion.

FIG. 2 shows a specific flow of the power allocation method provided in this embodiment. The method comprises the following steps.

Step 201: A UE receives uplink scheduling information, then determines a corresponding uplink transmit power on each uplink carrier according to the uplink scheduling information, and prepares uplink transmission data, where a first reference subframe is a subframe which is determined according to the uplink scheduling information to transmit an uplink channel/signal.

Preferably, on an uplink carrier, the UE can operate in a one-step scheduling mode, i.e., in an existing LTE scheduling mode. A base station transmits an uplink scheduling signaling in a subframe $t_0$ to indicate the UE to transmit an uplink channel/signal in a subframe $t_2$. The frequency-domain resource allocation, the modulation and coding scheme, the power control method and the like of the transmitted uplink channel/signal are all indicated by the uplink scheduling signaling, and the uplink transmission time is also indicated by the uplink scheduling signaling. For example, a time interval between a subframe in which the uplink scheduling signaling is received and a subframe for transmitting an uplink channel/signal scheduled by the uplink scheduling signaling is predefined by the system, or is dynamically indicated by the uplink scheduling signaling. The time interval between the uplink scheduling signaling and the transmission of the uplink channel/signal is not less than a minimum processing time delay $\Delta t$.

On an uplink carrier, the UE can also operate in a two-step scheduling mode. In other words, a base station transmits a first scheduling signaling in a subframe $t_0$ to indicate the resource allocation, modulation and coding information of the uplink channel/signal to be transmitted by the UE, and/or power control information, and/or information about the transmission time. The base station can semi-statically configure the scheduling as one-step scheduling or two-step scheduling. The base station can also dynamically configure the scheduling as one-step scheduling or two-step scheduling, for example, by using a predefined bit in the UL grant or a predefined RNTI in the UL grant. It is to be noted that, the information about the transmission time does not shows the time of indicating the UE to transmit the uplink channel/signal. For example, the UE cannot determine the transmission time of the scheduled uplink channel/signal merely depending upon the time information. The time information can only comprise a time offset of the transmission time of the scheduled uplink channel/signal with respect to the second scheduling signaling. After the subframe $t_0$, the base station selects, according to a scheduling algorithm, a proper time to trigger the UE to transmit the uplink channel/signal scheduled by the first scheduling signaling. In other words, the base station transmits a second scheduling signaling in a subframe $t_1$ to trigger the transmission of the uplink channel/signal. The second scheduling signaling can be a cell-specific trigger signaling, or a UE-group trigger signaling, or a UE-specific trigger signaling. This is not limited in the present invention. The second scheduling signaling triggers the UE to transmit the uplink channel/signal scheduled by the first scheduling signaling in a subframe $t_2$. The second scheduling signaling can contain only a trigger signaling, but also information indicative of the transmission time, and/or contain power control information and the like. It is assumed that a minimum time interval from the second scheduling signaling to the transmission of the uplink channel/signal by the UE is $\Delta t'$. Generally, $\Delta t' < \Delta t$. In other words, the minimum processing time delay $\Delta t'$ between the uplink scheduling signaling of the second scheduling signaling for two-step scheduling and the transmission of the uplink channel/signal is generally less than the minimum processing time delay $\Delta t$ between the scheduling signaling for one-step scheduling and the transmission of the uplink channel/signal.

It is to be noted that, for a same UE, on different carriers, the minimum processing time delay from the receipt of a scheduling signaling to the transmission of the scheduled uplink channel/signal by the UE may be different. For example, as described above, if the two-step scheduling is adopted, the minimum processing time delay $\Delta t'$ between the second scheduling signaling for two-step scheduling and the transmission of the uplink channel/signal is generally less than the minimum processing time delay $\Delta t$ between the scheduling signaling for one-step scheduling and the transmission of the uplink channel/signal. Thus, if at least one of a multiple of carriers configured for the UE scheduled by the two-step scheduling while at least one of the carriers scheduled by the one-step scheduling, the minimum processing time delay of the UE on the multiple of carriers is different. For another example, even in the one-step scheduling (also possibly in the two-step scheduling), in order to support transmission with a low transmission latency, or in the 5G mobile communication technology system, a multiple of carriers for the UE may adopt scheduling unit TTIs (Transmission Time Intervals) with different lengths. For example, one carrier has a conventional TTI length of 1 ms, while another carrier, for example, can support a TTI length of 0.25 ms in order to support the low-latency transmission. A different TTI length may be achieved by a different subcarrier spacing. For example, if a time slot has seven OFDM symbols, a TTI length corresponding to a subcarrier spacing of 15 KHz is 0.5 ms and a TTI length corresponding to a subcarrier spacing of 60 KHz is 0.125 ms. A different TTI length may also be achieved by a same subcarrier spacing and a different number of OFDM symbols. For example, also at a subcarrier spacing of 15 KHz, the TTI length of a carrier is a time slot having seven OFDM symbols and the TTI length of another carrier is a mini time slot having two OFDM symbols. Hence, the minimum processing time delay of the UE on a carrier having a short TTI length is less than the minimum processing time delay on the conventional LTE carrier. For example, the minimum processing time delay on a carrier with 1 ms TTI is X ms, while the minimum processing time delay on a carrier with 0.25 ms TTI is about X/4 ms. A specific way of configuring the TTI length can be: semi-statically configuring some subframes on a certain carrier at TTIs of a length and other subframes at TTIs of another length, or configuring the TTI length of a subframe in real time by a dynamic signaling, or in other ways. The way of configuring the TTI length is not limited in the present invention.

In this step, the UE receives uplink scheduling information from a control node. The uplink scheduling information is uplink scheduling information in the one-step scheduling, or a first scheduling signaling in the two-step scheduling.

The UE can prepare an uplink transmit power according to the uplink scheduling information by at least one of the following ways.

Way 1: The UE determines, according to the received uplink scheduling signaling and on a corresponding uplink carrier, a UE transmit power expected by the base station, compares the UE transmit power with a maximum transmit power Pcmax,c of the uplink carrier, and uses the smaller one as the transmit power of the UE.

For example, the UE transmit power expected by the base station is calculated according to the PUSCH transmit power formula in TS 36.213.5.1:

$$P_{PUSCH,c}(i) = \min\begin{cases} P_{CMAX,c}(i), \\ 10 \log_{10}(M_{PUSCH,c}(i)) + P_{O\_PUSCH,c}(j) + \\ \alpha_c(j) \cdot PL_c + \Delta_{TF,c}(i) + f_c(i) \end{cases}$$

where $M_{PUCSH,c}(i)$, $\Delta_{TF,c}(i)$ and $f_c(i)$ are directly or indirectly obtained from the uplink scheduling information. Specific meanings of the parameters refer to the explanation in TS 36.213.5.1.

Preferably, for a UE scheduled by the two-step scheduling, if the UE starts adjusting power upon receiving the first scheduling signaling, then, Way 1 is more suitable for the UE. Since the UE cannot determine when to transmit the scheduled uplink channel/signal upon receiving the first scheduling signaling and thus cannot determine the maximum transmit power Pcmax of the UE in transmitting the uplink channel/signal, at this stage, the UE cannot further adjust the transmit power on each carrier according to the Pcmax so that the power of the simultaneously transmitted carriers does not exceed the Pcmax.

Of source, it is not executed that a UE adopting the one-step scheduling can adopt this way.

Way 2: Step 1: The UE determines, according to the received first scheduling information and on a corresponding uplink carrier, a UE transmit power expected by the base station, compares the UE transmit power with the Pcmax,c of the uplink carriers, and uses the smaller one as the transmit power of the UE. Step 2: The UE determines whether the sum of the transmit power on all uplink carriers scheduled for transmission exceeds the maximum transmit power Pcmax' predicted by the UE; and, if exceed, the power of a corresponding uplink carrier is adjusted according to a predefined second priority, so that the sum of power on all uplink carriers does not exceed the Pcmax'. The two steps are not necessarily performed temporally in two steps, and can be simultaneously performed temporally.

It is not hard to see that, step 1 of Way 2 is Way 1, where for each uplink carrier, the power on each uplink carrier is determined separately according to the Pcmax,c of each uplink carrier and the uplink scheduling information from the base station; while in step 2 of Way 2, the power of each uplink carrier is further adjusted according to the total maximum transmit power Pcmax' assumed by the UE.

Preferably, the second priority can be in accordance with the prior art. For example, the priority of a carrier containing uplink control information is higher than that of a carrier containing no uplink control information. The second priority can also be a newly defined priority. For example, the priority of a licensed carrier is higher than that of an unlicensed carrier; or, the priority of a carrier to be absolutely transmitted is higher than that of a carrier to be possibly transmitted; and the like.

Preferably, Way 2 is more suitable for a UE adopting the one-step scheduling, particularly a UE that performs both bit preparation and power preparation of the uplink signal/channel. The UE can determine the transmission time of the scheduled uplink channel/signal upon receiving the uplink scheduling signaling. Therefore, the UE can at least predict the Pcmax' of a subframe $t_2$ (called the first reference subframe) for transmitting the scheduled uplink channel/signal in accordance with a predefined method, and further adjust the power of each uplink carrier on the basis of the Pcmax'. It is assumed that the UE starts to prepare a subframe t of the scheduled uplink channel/signal as a second reference subframe after receiving the uplink scheduling signaling. Preferably, the time difference between the second reference subframe and the first reference subframe is equal to the minimum processing time delay for processing the PUSCH on this carrier. Although the minimum processing time delay $\Delta t$ or $\Delta t'$ on each carrier may be different, after the second reference subframe, the base station may still schedule other uplink carriers to perform transmission on the subframe $t_2$, for example, schedule a TTI with a smaller minimum processing time delay, so that the Pcmax for the subframe $t_2$ is different from the Pcmax' predicted by the UE. If the UE has no time to adjust power according to the actual Pcmax (e.g., step 202), Way 2 still cannot completely overcome the UE power waste or the loss of UE uplink transmission resulted from the difference between the actual Pcmax and the predicted Pcmax'. However, compared with Way 1, Way 2 can reduce the UE power waste or the possibility of giving up transmitting the uplink signal to a certain extent.

In step 2, the UE can predict the total transmit power Pcmax' of the UE in the first reference subframe by one of the following methods, and then perform the power adjustment on the corresponding carrier based on the total transmit power Pcmax'. Generally, in the one-step scheduling method, the second reference subframe is a subframe next to a subframe in which the uplink scheduling signaling is received. For example, if the UE receives the uplink scheduling signaling in a subframe $t_0$, the UE starts preparing, in a subframe $t_{0+1}$, the uplink channel/signal scheduled by the uplink scheduling signaling. Alternatively, in the one-step scheduling method, the second reference subframe is not earlier than the subframe receiving the uplink scheduling signaling, and the time difference between the second reference subframe and the first reference subframe is equal to the minimum processing time delay for the UE to process the PUSCH on this carrier.

Method (a): When predicting the total transmit power of the first reference subframe, only an uplink carrier, which can be determined before the second reference subframe to perform transmission in the first reference subframe, is considered as a transmitting carrier, and the transmit power of the transmitting carrier is calculated.

As an implementation, regardless of whether the uplink carrier eventually transmits an uplink channel/signal in the first reference subframe, the UE determines, only according to the received scheduling signaling before the second reference subframe, whether the corresponding carrier performs transmission in the first reference subframe. In other words, when and only when the UE has received the uplink scheduling signaling of the corresponding carrier before the second reference subframe and the scheduling signaling indicates that the UE transmits the uplink channel/signal in the first reference subframe, the uplink carrier is considered as a transmitting uplink carrier, and other uplink carriers are all considered as not to perform transmission.

Preferably, for an uplink carrier by the one-step scheduling, if the UE has received an uplink scheduling signaling UL grant for scheduling transmission in the first reference subframe before the second reference subframe, the uplink carrier is considered as a transmitting uplink carrier; or otherwise, the uplink carrier is considered as a non-transmitting uplink carrier.

Preferably, for an uplink carrier scheduled by the two-step scheduling, if the UE has received the second scheduling signaling before the second reference subframe, the uplink carrier is considered as a transmitting uplink carrier when the uplink transmission triggered by the second scheduling signaling is performed in the first reference subframe; or otherwise, the uplink carrier is considered as a non-transmitting uplink carrier.

Preferably, for an uplink carrier scheduled by the two-step scheduling, if the UE has not received the second scheduling signaling or the first scheduling signaling before the second reference subframe, the uplink carrier is considered as a non-transmitting uplink carrier.

In a specific application scenario, as shown in FIG. 3, the base station configures two uplink carriers for the UE, where the CC1 is a licensed frequency band carrier and the CC2 is an unlicensed frequency band carrier. It is assumed that the CC1 is scheduled by one-step scheduling g while the CC2 is scheduled by two-step scheduling. The UE receives, in a subframe $t_0$ (a subframe t−1 in this example), a schedule for allowing the carrier CC1 to transmit a PUSCH in a first reference subframe $t_2$. The UE starts preparing the transmission of the PUSCH in a subframe t, and it is required to predict the total transmit power of all carriers of the UE in the subframe $t_2$. Since the UE has not received the second scheduling information in spite of having received the first scheduling information for the CC2 before the start of the subframe t, the UE is unable to know whether the CC2 will transmit an uplink channel/signal in the subframe $t_2$. Consequently, the UE can only assume that the CC2 will not transmit an uplink channel/signal in the subframe $t_2$ while the CC1 will transmit an uplink channel/signal in the subframe $t_2$, so as to determine the maximum transmit power of the UE. Furthermore, the maximum transmit power is compared with the power of the CC1 determined by taking Pcmax,c as an upper limit, so that the power of the CC1 cannot exceed the maximum transmit power.

In another specific application scenario, as shown in FIG. 4, the base station configures two uplink carriers for the UE, where the CC1 carrier has a TTI length of 1 ms and the CC2 carrier has a TTI length of 0.25 ms. The two carriers both adopt one-step scheduling. The minimum time delay from the scheduling signaling of the CC1 carrier to the uplink transmission is 4 ms, and the minimum time delay from the scheduling signaling of the CC2 carrier to the uplink transmission is 1 ms. The UE receives, in a subframe $t_0$ (a subframe t−1 in this example), a schedule for allowing the carrier CC1 to transmit a PUSCH on a first reference subframe $t_2$. The UE starts preparing the transmission of the PUSCH in a subframe t, and it is required to predict the total transmit power of all uplink carriers of the UE in the subframe $t_2$. Since the UE has not received scheduling information for the CC2 before the start of the subframe t, the UE is unable to know whether the CC2 will transmit an uplink channel/signal in the subframe $t_2$. Consequently, the UE can only assume that the CC2 will not transmit an uplink channel/signal in the subframe $t_2$ while the CC1 will transmit an uplink channel/signal in the subframe $t_2$, so as to determine the maximum transmit power of the UE. Furthermore, the maximum transmit power is compared with the power of the CC1 determined by taking Pcmax,c as an upper limit, so that the power of the CC1 cannot exceed the maximum transmit power. In this example, for the transmission of uplink data of the carrier CC2, the maximum total transmit power of the UE can be determined according to the transmissions of the CC1 and the CC2. The UE has received a scheduling signaling for the CC1 when receiving an uplink scheduling signaling for the carrier CC2. Thus, the transmission condition of the CC1 and the required uplink power can be determined, and the total power of the UE in the first reference subframe can be determined. If the sum of the power of the CC1 and the power of the CC2 exceeds the maximum transmit power of the UE, the UE can adjust the power of the CC2 according to a predefined rule, so that the sum of the power of the CC1 and the power of the CC2 does not exceed the maximum transmit power. For example, it is possible to ensure, according to the first priority rule in step 202, that a carrier with a maximum processing time delay from the receipt of the scheduling signaling by the UE to the transmission of the scheduled uplink channel/signal by the UE has a higher priority, that is, the power of the CC1 is ensured while the power of the CC2 is reduced; or, it is also possible to ensure, according to whether a service with higher performance requirements is contained, for example, the time delay requirements for the ultra-reliable and low-latency communications (URLLC) services should be more stringent than those for common enhanced mobile broadband (eMBB) services. For example, according to the first priority rule in step 202, that a carrier with a shorter scheduling unit length has a higher priority, that is, the power of the CC2 is ensured. If the priority of the CC1 is lower, it is required to reduce the power. However, if the CC1 has not enough time to reduce its power, there is no choice other than dropping transmitting the CC1.

Method (b): When predicting the total transmit power of the UE in the subframe $t_2$, an uplink carrier which can be determined in or before the second reference subframe to transmit a PUSCH in the first reference subframe and an uplink carrier which possibly transmits a PUSCH in the first reference subframe are calculated.

As an implementation, for an uplink carrier which can be determined in or before the second reference subframe not to transmit a PUSCH on the first reference subframe, the UE determines the uplink carrier as a non-transmitting uplink carrier; however, for an uplink carrier which can be determined in or before the second reference subframe to transmit a PUSCH in the first reference subframe or an uplink carrier which possibly transmits a PUSCH in the first reference subframe, the UE determines the uplink carrier as a transmitting uplink carrier.

Preferably, for an uplink carrier by the one-step scheduling, if the UE has received a UL grant signaling for scheduling transmission in the first reference subframe before the second reference subframe, the uplink carrier is considered as a transmitting uplink carrier; or otherwise, the uplink carrier is considered as a non-transmitting uplink carrier.

Preferably, for an uplink carrier scheduled by the two-step scheduling, if the UE has received the second scheduling signaling before the second reference subframe, the uplink carrier is considered as a transmitting uplink carrier when the uplink transmission triggered by the second scheduling signaling is performed in the first reference subframe; or otherwise, the uplink carrier is considered as a non-transmitting uplink carrier.

Preferably, for an uplink carrier scheduled by the two-step scheduling, if the UE has received the first scheduling signaling but not the second scheduling signaling in or before the second reference subframe, the UE can determine, according the first scheduling signaling, whether the uplink carrier is a transmitting uplink carrier. For example, if the received first scheduling signaling indicates that the uplink transmission is absolutely impossible to be performed in the first reference subframe, the UE can determine the corresponding uplink carrier as a non-transmitting uplink carrier. And/or, if the UE cannot exclude the possibility of performing uplink transmission in the first reference subframe by using the received first scheduling signaling, the UE decides that the uplink carrier is a transmitting uplink carrier.

Preferably, for an uplink carrier scheduled by the two-step scheduling, if the UE has not received the first scheduling signaling in or before the second reference subframe, the UE determines the corresponding uplink carrier as a non-transmitting uplink carrier.

In a specific embodiment, as shown in FIG. 3, the base station configures two uplink carriers for the UE, where the CC1 is a licensed frequency band carrier and the CC2 is an unlicensed frequency band carrier. It is assumed that the CC1 is scheduled by one-step scheduling while the CC2 is scheduled by two-step scheduling. The UE receives, in a subframe $t_0$ (a subframe t−1 in this example), a schedule for allowing the carrier CC1 to transmit a PUSCH in a first reference subframe $t_2$. The UE starts preparing the transmission of the PUSCH in a subframe t, and it is required to predict the total transmit power of all carriers of the UE in the subframe $t_2$. Since the UE has received first scheduling information for the CC2 but not received second scheduling information before the subframe t, the UE is unable to know whether the CC2 will transmit an uplink channel/signal in the subframe $t_2$. Despite this, the UE still assumes that the CC2 will transmit an uplink channel/signal in the subframe $t_2$ and the CC1 will transmit an uplink channel/signal in the subframe $t_2$, so as to determine the maximum transmit power of the UE. Furthermore, the maximum transmit power Pcmax' assumed by the UE is compared with the power of the CC1 determined by taking Pcmax,c as an upper limit, so that the power of the CC1 cannot exceed Pcmax'. Thus, a relatively conservative maximum power is obtained by calculating Pcmax'. If the CC2 transmits an uplink channel/signal in the subframe $t_2$, it can be no problem to enable the CC1 to perform transmission in accordance with the adjusted power. However, if the CC2 does not perform transmission in the subframe $t_2$, the actual maximum transmit power Pcmax becomes higher, it is possible that the CC1 makes an unnecessary power reduction in this step.

Step 202: The UE adjusts, according to an actual maximum uplink transmit power Pcmax of the first reference subframe and a first priority, the transmit power of each uplink carrier, and/or determines whether to transmit an uplink signal.

Preferably, the predefined first priority means that a carrier with a maximum minimum-processing time delay from the receipt of a scheduling signaling by the UE to the transmission of the scheduled uplink channel/signal by the UE has a higher priority.

Preferably, the predefined first priority means that a carrier with a shorter scheduling unit time (TTI) length has a higher priority.

Preferably, the predefined first priority means that a carrier configured to adopt one-step scheduling has a higher priority than a carrier configured to adopt two-step scheduling.

Preferably, the predefined first priority means that a licensed frequency band carrier has a higher priority than an unlicensed frequency band carrier.

Preferably, the predefined first priority means that an uplink signal containing an uplink control signaling has a higher priority than an uplink signal containing no uplink control signaling.

Preferably, the predefined first priority means that a carrier which has been determined to transmit an uplink channel/signal in or before the second reference subframe is superior to a carrier which has not been determined to transmit an uplink channel/signal before the second reference subframe.

If the sum of transmit power of the carriers exceeds the actual maximum uplink transmit power of the UE and if the UE has enough time to reduce the power, according to the first priority, the power of a carrier having a lower priority can be further reduced to $P_{j,c}$ on the basis of the transmit power $P_{i,c}$ determined in step 201, so that the sum of power of all transmitting carriers does not exceed Pcmax. Or, the transmission of the power having a low priority is dropped. If the UE has not enough time to perform power adjustment on a carrier whose power is expected to be reduced, the UE can only drop transmitting a carrier having a lower priority, and transmit a carrier having a higher priority according to the transmit power $P_{i,c}$ determined in step 201, so that the sum of power of all transmitting carriers cannot exceed Pcmax. As an implementation, the UE can separately perform the bit preparation of the uplink signal and the power adjustment of the uplink signal.

Preferably, the base station can allocate a minimum guaranteed transmit power Pg for each carrier or a carrier group. When it is not determined whether the carrier performs uplink transmission, the power allocated to other carriers cannot exceed Pcmax-Pg. For example, the base station configures three carriers for the UE, where the CC1 and the CC2 forms a carrier group, and the CC3 forms a carrier group. The base station allocates Pg1 to the carrier group formed by the CC1 and the CC2, and allocates Pg2 to the CC3. When the UE adjusts the uplink power of the CC1 and the CC2, if the UE is unable to determine whether the CC3 may perform transmission simultaneously, the total power allocated to the CC1 and the CC2 by the UE cannot exceed Pcmax-Pg2. When and only when the UE determines that the CC3 will not perform transmission simultaneously, the total power which can be allocated to the CC1 and the CC2 by the UE cannot exceed Pcmax. It is to be noted that the way of classifying a carrier group is not limited in the present application. For example, a multiple of carriers with a determined carrier index can be classified into one carrier group, or a multiple of carriers with a same TTI length can be classified into one carrier group, and so on.

It is to be noted that, in Way 1 of the step 201, the power of each carrier is not adjusted with respect to the size of the total power. Thus, it is more possible in the step 202 that the sum of power of the carriers exceeds the maximum transmit power of the UE. If, for these carriers, the UE has no time to adjust the power, the UE needs to ensure the power of a carrier having a higher priority and drops a carrier having a lower priority in accordance with the priority.

In addition, in this embodiment, the UE can be supported to adopt different methods for power control on different carriers. For example, it is assumed that the carriers configured for the UE have a same TTI length, and some of the carriers are configured to adopt two-step scheduling while the remaining carriers are configured to adopt one-step scheduling. Hence, the UE can adopt Way 1 in the step 201 and the step 202 with regard to the carriers scheduled by the two-step scheduling, and adopt Way 2 in the step 201 and the step 202 with regard to the carriers adopting the one-step scheduling. In this embodiment, the UE can also be supported to adopt a same method for power control on all the carriers.

In a specific application scenario, as shown in FIG. 5, the base station configures three uplink carriers for the UE, where the CC1 and CC2 are licensed frequency band carriers and the CC3 is an unlicensed frequency band carrier. It is assumed that the CC1 and the CC2 is scheduled by one-step scheduling while the CC3 is scheduled by two-step scheduling. If it is assumed that the UE simultaneously prepares an uplink transmission bit and a transmit power, the required minimum processing time delay is 4 ms. For all the three carriers, the UE adopts Way 1 in the step 201: it is assumed that the UE has received, in a subframe $t_0$ (a subframe t−1 in this example), a schedule for allowing the carriers CC1 and CC2 to transmit PUSCHs in a first reference subframe $t_2$, where the PUSCH of the CC1 contains uplink control information while the PUSCH of the CC2 does not contain uplink control information. The UE starts preparing, in a subframe t, the transmission of the PUSCHs of the two carriers. The minimum time delay required by the UE to prepare the uplink transmission bit and the transmit power is 4 ms. In other words, a time interval between the subframe t and the subframe $t_2$ is 4 ms. The UE determines the uplink transmit power of the CC1 according to Pcmax,c of the CC1 and the uplink power scheduled by the base station indicated by the received scheduling signaling, for example, the power being 10. The UE determines the uplink transmit power of the CC2 according to Pcmax,c of the CC2 and the uplink power scheduled by the base station indicated by the received scheduling signaling, for example, the power being 12. Before the subframe t, the UE has received the first scheduling information for the CC3 but not received the second scheduling information, so the UE is unable to know whether CC3 will transmit an uplink channel/signal in the subframe $t_2$. The UE determines the uplink transmit power of the CC3 according to Pcmax,c of the CC3 and the uplink power scheduled by the base station indicated by the received first scheduling signaling, for example, the power being 8. The UE receives, in a subframe $t_3$, a second scheduling signaling for the CC3, and determines that the UE also transmits, in the first reference subframe $t_2$, a PUSCH containing no uplink control information on the CC3. The UE determines, according to the information about the PUSCHs to be transmitted by the three CCs, Pcmax of the first reference subframe $t_2$, for example, 20. Hence, in the step 202, according to the predefined priority, for example, the uplink control signaling is superior to a PUSCH containing no uplink control signaling, the UE determines the priority is CC1>CC2=CC3. Therefore, the power of the CC1 is first ensured to be 10, and the remaining power of 20−10=10 can be used for transmitting the CC2 or CC3. Since the CC2 requires a power of 12 and the CC3 requires a power of 8, the UE transmits the CC1 and the CC3 and gives up transmitting the CC2.

In another specific application scenario, the base station configures three uplink carriers for the UE, where the CC1 and the CC2 are licensed frequency band carriers and the CC3 is an unlicensed frequency band carrier. It is assumed that the CC1 and the CC2 is scheduled by one-step scheduling while the CC3 is scheduled by two-step scheduling. If it is assumed that the UE simultaneously prepares an uplink transmission bit and a transmit power, the required minimum processing time delay is 4 ms. For the carriers CC1 and CC2, the UE adopts the method (a) in Way 2 in the step 201; while for the carrier CC3, the UE adopts Way 1 in the step 201: it is assumed that the UE receives, in a subframe $t_0$ (a subframe t−1 in this example), a schedule for allowing the carriers CC1 and CC2 to transmit PUSCHs in the first reference subframe $t_2$, where the PUSCH of the CC1 contains uplink control information while the PUSCH of the CC2 does not contain uplink control information. The UE starts preparing, in a subframe t, the transmission of the PUSCHs of the two carriers. The minimum time delay required by the UE to prepare the uplink transmission bit and the transmit power is 4 ms. In other words, a time interval between the subframe t and the subframe $t_2$ is 4 ms. The UE determines the uplink transmit power of the CC1 according to Pcmax,c of the CC1 and the uplink power scheduled by the base station indicated by the received scheduling signaling, for example, the power being 10. The UE determines the uplink transmit power of the CC2 according to Pcmax,c of the CC2 and the uplink power scheduled by the base station indicated by the received scheduling signaling, for example, the power being 12. Before the subframe t, the UE has received the first scheduling information for the CC3 but not received the second scheduling information, so the UE is unable to know whether CC3 will transmit an uplink channel/signal in the subframe $t_2$. The UE determines the uplink transmit power of the CC3 according to Pcmax,c of the CC3 and the uplink power scheduled by the base station indicated by the received first scheduling signaling, for example, the power being 8. While in the second reference subframe, the UE assumes Pcmax' of the first reference subframe is calculated based on the assumption of transmitting the CC1 and the CC2 and not transmitting the CC3 in the first reference subframe, wherein the Pcmax' is e.g., 21. Hence, according to the second priority, CC1>CC2, the UE ensures the uplink transmit power 10 of the CC1 and reduces the uplink transmit power of the CC2 to 11, and the UE does not adjust the power of the CC3. The UE receives, in a subframe $t_3$, a second scheduling signaling for the CC3, and determines that the UE also transmits, on the first reference subframe $t_2$, a PUSCH containing no uplink control information on the CC3. The UE determines, according to the information about the PUSCHs to be transmitted by the three CCs, the actual Pcmax of the first reference subframe $t_2$, for example, 20. Hence, in the step 202, according to the predefined first priority, for example, a carrier which is determined to perform transmission in the second reference subframe is superior to a carrier which is not determined to perform transmission, the UE determines the priority is CC1>CC2>CC3. Therefore, the UE transmits the CC1 and the CC2, and gives up transmitting the CC3. Since the CC3 is not transmitted, Pcmax is still 21. Therefore, no further adjustment is to be performed on the power of the CC1 and the power of the CC2.

In the above example, if it is assumed that the UE separately prepares the uplink transmission bit and the transmit power, the required minimum processing time delay is 1 ms. Hence, in the step 201, if the method 1 is adopted, the UE separately determines the power of the three CCs as 10, 12 and 8. In the step 202, the UE determines the actual Pcmax as 20; and, according to the predefined first priority, for example, whether containing the uplink control information, i.e., the priority is CC1>CC2=CC3, the UE determines that the power of the CC1 remains unchanged and is still 10, and the CC2 and the CC3 equally shares the remaining 10. That is, the UE adjusts the power of the CC2 as 6 and the power of the CC3 as 4. The UE transmits all the CC1, CC2 and CC3.

In still another specific application scenario, as shown in FIG. 6, the base station configures two uplink carriers for the UE, where the CC1 carrier has a subframe duration of 1 ms and the CC2 carrier has a subframe duration of 0.25 ms. The two carriers both adopt one-step scheduling. The minimum time delay from the uplink scheduling signaling of the CC1 carrier to the uplink transmission is 4 ms, and the minimum time delay from the uplink scheduling signaling of the CC2 carrier to the uplink transmission is 1 ms. The UE receives, in a subframe $t_0$ (a subframe t−1 in this example), a schedule for allowing the carrier CC1 to transmit a PUSCH in a first reference subframe $t_2$. The UE starts preparing, in a subframe t, the transmission of the PUSCH. In accordance with the method (a) of Way 2 in the step 201, the UE needs to predict the total transmit power of the UE in all carriers of the subframe $t_2$. Since the UE has not received scheduling information for the CC2 before the subframe t, the UE is unable to know whether the CC2 will transmit an uplink channel/signal in the subframe $t_2$. Consequently, the UE can only assume that the CC2 will not transmit an uplink channel/signal in the subframe $t_2$ while the CC1 will transmit an uplink channel/signal in the subframe $t_2$, so as to determine the maximum transmit power of the UE, Pcmax'=18. It is determined, according to the Pcmax,c of the CC1 and the power scheduled by the base station, that the power of the CC1 is 12, which does not exceed Pcmax', so it is not required to further reduce the power. The UE receives, in a subframe $t_3$, a scheduling signaling for the CC2, and determines to transmit the CC2 in the subframe $t_2$. Hence, the UE starts preparing the power of the CC2, and determines, according to Pcmax,c of the CC1 and the power scheduled by the base station, that the power of the CC2 is 10. The UE determines to simultaneously transmit the CC1 and the CC2 in the subframe $t_2$, where Pcmax=16. If it is assumed that the first priority rule means that a carrier with a maximum processing time delay from the receipt of a scheduling signaling by the UE to the transmission of the scheduled uplink channel/signal by the UE has a higher priority, the UE ensures the power of the CC1. As a result, the power of the CC2 is to be reduced to 16−12=4. In this case, no any additional operation needs to be performed in the step 202. If the first priority means that a carrier containing a service with higher performance requirements has a higher priority, for example, low-latency data (URLLC data) borne by the carrier CC2, the priority of the CC2 is high. Thus, the power of the CC2 should be ensured to be 10, and the remaining power of 16−10=6 can be allocated to the CC1. However, if the CC1 has not enough time to adjust the power, the transmission of the CC1 is dropped, as shown in FIG. 7.

Embodiment 2

In this embodiment, a specific way of generating, by a UE, a PHR report of each carrier and transmitting the PHR on the selected carrier is as below.

When the conditions for reporting a PHR are satisfied, the UE selects an uplink carrier and an uplink subframe probably used to transmit PHR, then uses the uplink subframe as a PHR calculation reference subframe (called a first reference subframe), and determines, according to uplink scheduling information received in or before a second reference subframe, contents of the PHR of each uplink carrier. The UE generates a PHR report according to the determined contents of the PHR, and reports the PHR on the selected uplink carrier in the corresponding subframe.

The base station can semi-statically configure the scheduling mode of a certain carrier of the UE as one-step scheduling or two-step scheduling. The base station can also dynamically configure the scheduling mode as one-step scheduling or two-step scheduling, for example, by a predefined bit in the UL grant or a predefined RNTI in the UL grant.

FIG. 8 shows a specific flow of the method for generating and reporting a PHR provided in this embodiment. The method comprises the following the steps.

Step 801: When conditions for reporting a PHR are satisfied, a UE selects, from at least one uplink carrier, one uplink carrier for reporting the PHR, and determines an uplink subframe probably used to transmit the PHR, the uplink subframe being a first reference subframe.

Wherein, the satisfied conditions for reporting a PHR can be conditions defined in the existing LTE system, for example, the trigger conditions in TS 36.321 5.4.6 such as newly activating an uplink carrier, a large change in downlink path loss, or PHR-timer expire and the like. It is to be noted that other satisfied conditions for reporting a PHR are also applicable to the present invention and will not be limited herein.

Preferably, the UE can select, after the PHR report conditions are satisfied, an uplink carrier with initial uplink PUSCH transmission (not retransmission), and the PUSCH is sufficient to transmit a PHR on the uplink carrier bearing the PHR.

Preferably, the UE can select an uplink carrier in a licensed frequency band to transmit the PHR.

Preferably, the UE can select an uplink carrier in an unlicensed frequency band to transmit the PHR.

Preferably, the UE shall select to transmit the PHR on a one-step scheduled PUSCH.

Preferably, the UE can select to transmit the PHR on a one-step scheduled PUSCH, or transmit the PHR on a two-step scheduled PUSCH.

Preferably, the UE selects a first reference subframe reporting the PHR as a PHR reference subframe. In other words, the PHR calculated by the UE is determined based on the uplink transmission condition of each carrier in the first reference subframe assumed by UE.

Preferably, if the UE selects to transmit the PHR on a one-step scheduled uplink carrier, the first reference subframe is a subframe in which UE transmits a PUSCH containing the PHR. If the LBT fails, the UE cannot transmit the PUSCH, but still considers this subframe as the first reference subframe.

Preferably, if the UE decides to transmit the PHR on a two-step scheduled uplink carrier, the first reference subframe is a subframe assumed by the UE to transmit a PUSCH containing the PHR, for example, a subframe X milliseconds after receiving the first scheduling signaling for the uplink carrier. For example, if the UE receives the first scheduling signaling in a subframe n, the first reference subframe is n+4.

It is to be noted that, the PHR report is an MAC layer signaling; and it takes a certain processing time for the UE to generate the corresponding MAC layer signaling, then contain the corresponding MAC layer signaling in a corresponding MAC PDU, and then bear the corresponding MAC PDU by a physical layer PUSCH channel. It is assumed that the shortest processing time is $\Delta m$. When the PHR is transmitted on an uplink carrier of a two-step scheduled unlicensed frequency band, since the time delay from the second scheduling signaling to the first reference subframe is short, often less than $\Delta m$, and is thus insufficient to prepare the PHR report by the UE, in this case, the UE cannot select such a carrier. For example, the moment when the PHR report conditions are satisfied is t', and the UE receives a first scheduling signaling for an uplink carrier CC1 at moment t'−1 ms and a first scheduling signaling for an uplink carrier CC2 at a moment t'. The UE receives a second scheduling signaling for the uplink carrier CC1 at moment t'+1 ms to trigger to transmit a PUSCH at moment t'+3 ms, and the UE receives a second scheduling signaling for the uplink carrier CC2 at moment t'+2 ms to trigger to transmit a PUSCH at moment t'+5 ms. If it is assumed that it takes at least $\Delta m=4$ ms for the UE to generate and transmit a PHR report, the UE can only select the uplink carrier CC2 to transmit the PHR, and the first reference subframe is the subframe t'+5.

It is to be noted that the moment t' when the PHR report conditions are satisfied and the moment when the UE selects an uplink carrier and an uplink subframe for reporting the PHR are not limited to be the same. It is possible that the UE selects, at a certain moment after the PHR report conditions are satisfied, an uplink carrier and an uplink subframe for reporting the PHR, and then starts preparing the PHR. For example, if the moment when the PHR report conditions are satisfied is t', the UE receives a scheduling signaling from PCell at moment t'+2 ms and it is assumed that it takes 1 ms for the UE to decode the scheduling signaling, the moment when the UE selects an uplink carrier and an uplink subframe for reporting the PHR is t'+3 ms.

Step 802: according to uplink scheduling information received in or before a second reference subframe, PHR contents of each uplink carrier to be reported in the first reference subframe are determined, and a corresponding PHR value is determined according to the PHR contents.

Preferably, the second reference subframe is not prior to the subframe satisfying the PHR triggering conditions. Moreover, the second reference subframe is before the first reference subframe, and the time interval between the second reference subframe and the first reference subframe is no shorter than or equal to the minimum processing time $\Delta m$ required for the UE to generate the PHR, for example, $\Delta m=4$. It can be understood that the second reference subframe is a subframe in which the UE starts preparing the PHR report.

Preferably, a method for determining the second reference subframe can be subdivided into the following.

If the UE selects to transmit the PHR on an uplink carrier scheduled by one-step scheduling, and the base station transmits UL grant at moment $t_0$ which schedules the UE to transmit a PUSCH at moment $t_2$ (the first reference subframe), the second reference subframe in which the UE starts preparing the PHR report is a subframe in which the UE has received the UL grant. More specifically, the second reference subframe is a subframe in which the UE has decoded received the UL grant, for example a subframe following the subframe in which the UL grant is received. In the one-step scheduling, $(t_2-t_0)$ can be a fixed value, for example, 4 ms or a fixed value related to Time Division Duplexing (TDD) configuration; or, $(t_2-t_0)$ can also be a variable. For example, the value of $(t_2-t_0)$ is dynamically indicated by the UL grant. Or, the second reference subframe $t_0$ in which the UE starts preparing the PHR report is a subframe when an MAC layer starts generating a PHR MAC CE, or a subframe when a physical layer starts calculating the PHR value. $(t_2-t_0)$ can be a fixed value.

Preferably, if the UE selects to transmit the PHR on an uplink carrier scheduled by two-step scheduling, the base station transmits a first scheduling signaling UL grant schedules the uplink carrier at moment $t_0$ and the base station transmits a second scheduling signaling at moment $t_1$ to trigger the UE to transmit a PUSCH on the uplink carrier at moment $t_2$, the second reference subframe is a subframe in which the UE receives the first scheduling signaling UL grant or a subframe on which the UE decodes the first scheduling signaling UL grant, where the moment $t_0$ is not prior to the moment t' when the PHR report conditions are satisfied; and/or, the second reference subframe is the moment t' when the PHR report conditions are satisfied, where the moment $t_0$ is not later than the moment t' when the PHR report conditions are satisfied, and $(t_2-t')$ is not less than $\Delta m$; and/or, the second reference subframe is a subframe X following the subframe on which the UE receives the first scheduling signaling UL grant, where the moment $t_0$ is not prior to the moment t' when the PHR report conditions are satisfied, and X is not less than $\Delta m$; and/or, the second reference subframe is a subframe when an MAC layer starts generating a PHR MAC CE, or a subframe when a physical layer starts calculating the PHR value. It is to be noted that, since the base station does not know the moment t', the base station is unable to know the second reference subframe. Despite this, the UE will report whether the PHR type is a real value or a virtual value when reporting the PHR, so the understanding of the base station to the PHR will not be influenced.

Preferably, the determining PHR contents of each uplink carrier comprises: determining whether the PHR type is a real PHR or a virtual PHR. And, a PHR value is calculated according to the determined type. Wherein, the UE can determine the PHR type of each uplink carrier by one of the following two ways.

Way 1: For an uplink carrier which can be determined in or before the second reference subframe to transmit a PUSCH in the first reference subframe, the PHR type of the uplink carrier is a real PH. The PHR is determined according to the resource allocation information and/or Closed-loop Power Control (TPC) information indicated by the received scheduling signaling. In other words, the PHR of the PUSCH is calculated according to the formula of type 1 of "if the UE transmits a PUSCH only but does not transmit a PUCCH in a subframe i of a carrier c" in TS 36.213.5.1, for example:

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}$$

Or, the PHR of the PUSCH is calculated according to the formula of type 1 of "if the UE transmits both a PUSCH and a PUCCH in a subframe i of a carrier c", for example, $$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}$$

Wherein, the definitions of the parameters in the formulae refer to 5.1.1.1/5.1.1.2 in 36.213 of the 3GPP specification.

For convenience of description, in this embodiment, they are collectively called calculation of the PHR of the PUSCH, regardless of whether to simultaneously transmit a PUCCH. Moreover, in the 3GPP specification, it is also possible to calculate and report the PHR of type 2. This embodiment is applicable to the PHR of type 1, and is also applicable to the PHR of type 2. For convenience of description, they are collectively called calculation of the PHR of the PUSCH.

However, for an uplink carrier which has not been determined in or before the second reference subframe to transmit a PUSCH in the first reference subframe, the UE determines the PHR type of the uplink carrier as a virtual PHR. The PHR is calculated according to a predefined reference format, i.e., according to the PHR formula of type 1 "if the UE does not transmit a PUSCH" in TS 36.213.5.1, for example, $$PH_{type1,c}(i) = \tilde{P}_{CMAX,c}(i) - \{P_{O\_PUSCH,c}(1) + \alpha_c(1) \cdot PL_c + f_c(i)\}$$

Wherein, the definitions of the parameters in the formulae refer to 5.1.1.1/5.1.1.2 in 36.213 of the 3GPP specification.

This embodiment is applicable to the PHR of type 1, and is also applicable to the PHR of type 2. For convenience of description, they are collectively called calculation of the PHR of the PUSCH.

Preferably, if $\tilde{P}_{CMAX,c}(i)$ is related to whether other carriers transmit a PUSCH, and/or whether other carriers transmit a PUCCH, when calculating $\tilde{P}_{CMAX,c}(i)$, it is assumed that the uplink carrier which has been determined in the second reference subframe to transmit a PUSCH in the first reference subframe is a transmitting uplink carrier, and the uplink carrier which has not been determined in the second reference subframe to transmit a PUSCH in the first reference subframe is a non-transmitting uplink carrier.

Here, for convenience of description, for the uplink transmission on an unlicensed frequency band carrier, regardless of whether the UE passes Clear Channel Assessment (CCA) detection (access the unlicensed frequency band carrier), only if the received scheduling/trigger signaling indicates the transmission in the first reference subframe, it is assumed that the UE performs a PUSCH transmission in the first subframe, when calculating the PHR. Of course, based on the LBT mechanism, if the UE fails to pass the CCA detection, the UE will not transmit a PUSCH in the first reference subframe.

Preferably, when calculating the PHR of an uplink carrier scheduled by one-step scheduling, the UE can determine the PHR type of the corresponding uplink carrier according to whether the UL grant signaling for scheduling transmission in the first reference subframe has been received in or before the second reference subframe. In other words, if the UE has not received until the second reference subframe, the UL grant scheduling the transmission in the first reference subframe, the UE is absolutely impossible to transmit a PUSCH in the first reference subframe, so that the PHR of the corresponding uplink carrier is a virtual PHR. If the UE has received, in or before the second reference subframe, the UL grant for scheduling transmission in the first reference subframe, the PHR of the corresponding uplink carrier is a real PHR.

Preferably, when calculating the PHR of an uplink carrier scheduled by two-step scheduling, if the UE has received a second scheduling signaling in or before the second reference subframe, the UE can determine the PHR type of the corresponding uplink carrier according to whether the uplink transmission triggered by the second scheduling signaling is located in the first reference subframe. In other words, if the UE has received the second scheduling signaling in or before the second reference subframe which triggers uplink transmission, and the triggered uplink transmission is not to be transmitted in the first reference subframe, the UE is absolutely impossible to transmit a PUSCH in the first reference subframe, and the PHR of the corresponding carrier is a virtual PHR; and, if the UE has received the second scheduling signaling in or before the second reference subframe which triggers uplink transmission, and the triggered uplink transmission is to be transmitted in the first reference subframe, the PHR of the corresponding carrier is a real PHR, even in a case eventually UE does not transmit an uplink in the first reference subframe, such as the UE possibly fails to pass the CCA detection and does not transmit an uplink in the first reference subframe.

Preferably, when calculating the PHR of an uplink carrier scheduled by two-step scheduling, if the UE has not received the second scheduling signaling in or before the second reference subframe or not received the first scheduling signaling, the PHR of the corresponding uplink carrier is a virtual PHR, regardless of whether the UE eventually transmits an uplink signal in the first reference subframe.

Preferably, if the UE selects to transmit the PHR on a two-step scheduled PUSCH, the PHR of the uplink carrier of the PUSCH is a real PHR which is calculated according to the received first scheduling signaling.

In a specific application scenario, the base station configures three uplink carriers for the UE, where the CC1 is a licensed frequency band carrier, and the CC2 and the CC3 are unlicensed frequency band carriers. After the PHR triggering conditions are satisfied, the UE selects to report the PHR on the CC1, and the first reference subframe is $t_3$. In other words, the base station schedules the UE to transmit a PUSCH in the first reference subframe $t_3$ on the CC1, and the UE will include the PHR report in the PUSCH. The second reference subframe is moment t, where t is prior to $t_3$. It is assumed that the CC1 and the CC2 is scheduled by one-step scheduling while the CC3 is scheduled by two-step scheduling. When it is assumed that the UE has received, in the second reference subframe t, uplink scheduling signaling for the CC1 and CC2, and the UE has received a first scheduling signaling for the CC3 but not received a second scheduling signaling for the CC3. Then, the UE calculates real PHRs of the CC1 and CC2 according to the received scheduling signaling, and calculates a virtual PHR of the CC3 according to the predefined reference format, as shown in FIG. 9.

In another specific application scenario, it is assumed that the UE has received, in the second reference subframe t, uplink scheduling signalings for the CC1 and CC2, the UE has received the first scheduling signaling for the CC3 and the second scheduling signaling for the CC3, and the uplink transmission time triggered by the second scheduling signaling is a subframe $t_2$, where $t_2$ is not equal to the first reference subframe $t_3$. Hence, the UE calculates real PHRs of the CC1 and CC2 according to the received scheduling signaling, and calculates a virtual PHR of the CC3 according to the predefined reference format, as shown in FIG. 10.

In still another specific application scenario, it is assumed that the UE has received, in the second reference subframe t, uplink scheduling signalings for the CC1 and CC2, and the UE has received a first scheduling signaling for the CC3 and a second scheduling signaling of the CC3, the uplink transmission time triggered by the second scheduling signaling is a subframe $t_2$, where $t_2$ is equal to the first reference subframe $t_3$. Hence, the UE separately calculates real PHRs of the CC1, CC2 and CC3 according to the received scheduling signaling, as shown in FIG. 11.

In yet another specific application scenario, it is assumed that the UE has received, in the second reference subframe t, an uplink scheduling signaling for the CC1, and the UE has received a first scheduling signaling for the CC3, but not received a second scheduling signaling for the CC3 and an uplink scheduling signaling for the CC2. Hence, the UE calculates a real PHR of the CC1 according to the received scheduling signaling, and calculates virtual PHRs of the CC2 and CC3 according to the predefined reference format, as shown in FIG. 12.

Way 2: For an uplink carrier which can be determined in the second reference subframe to not transmit a PUSCH in the first reference subframe, the PHR type of the uplink carrier is a virtual PHR; however, for an uplink carrier which can be determined in the second reference subframe to transmit a PUSCH in the first reference subframe or for an uplink carrier which possibly transmits a PUSCH in the first reference subframe, the PHR type of the uplink carrier is a real PHR.

Preferably, if $\tilde{P}_{CMAX,c}(i)$ is related to whether other carriers transmit a PUSCH, it is assumed when calculating $\tilde{P}_{CMAX,c}(i)$ that the uplink carrier which can be determined in the second reference subframe to transmit a PUSCH in the first reference subframe or the uplink carrier which possibly transmits a PUSCH in the first reference subframe is a transmitting uplink carrier.

Preferably, when calculating the PHR of an uplink carrier scheduled by one-step scheduling, the UE can determine the PHR type of the corresponding uplink carrier according to whether the UL grant signaling for scheduling transmission in the first reference subframe has been received in the second reference subframe. In other words, if the UE has not received the UL grant scheduling the transmission in the first reference subframe until the second reference subframe, the UE is absolutely impossible to transmit a PUSCH in the first reference subframe, so that the PHR of the corresponding uplink carrier is a virtual PHR. If the UE has received, in or before the second reference subframe, the UL grant for scheduling transmission in the first reference subframe, the PHR of the corresponding uplink carrier is a real PHR.

Preferably, when calculating the PHR of an uplink carrier scheduled by two-step scheduling, if the UE has received a second scheduling signaling in or before the second reference subframe, the UE can determine the PHR type of the corresponding uplink carrier according to whether the uplink transmission triggered by the second scheduling signaling is located in the first reference subframe. In other words, if the UE has received the second scheduling signaling in or before the second reference subframe and then triggers uplink transmission, and the triggered transmission moment of the uplink transmission is not the first reference subframe, the UE is absolutely impossible to transmit a PUSCH in the first reference subframe, and the PHR of the corresponding carrier is a virtual PHR; and, if the UE has received the second scheduling signaling in or before the second reference subframe and then triggers uplink transmission, and the triggered transmission moment of the uplink transmission is the first reference subframe, the PHR of the corresponding carrier is a real PHR, even in a case where the UE possibly fails to pass the CCA detection and does not transmit an uplink in the first reference subframe eventually.

Preferably, when calculating the PHR of an uplink carrier scheduled by two-step scheduling, if the UE has received the first scheduling signaling but not received the second scheduling signaling in the second reference subframe, the UE can determine the PHR type of the corresponding uplink carrier according to the first scheduling signaling. For example, if the received first scheduling signaling can indicate that the uplink transmission is absolutely impossible to be performed in the first reference subframe, or if the second reference subframe is out of a valid time window of the first scheduling signaling, the PHR type of the corresponding uplink carrier is a virtual PHR. And/or, if the UE is unable to exclude the possibility of performing uplink transmission in the first reference subframe by using the received first scheduling signaling, for example, the first scheduling signaling does not contain information related to the transmission time or the contained information related to the transmission time cannot exclude the possibility of performing uplink transmission in the first reference subframe, the PHR type of the corresponding uplink carrier is a real PHR, regardless of whether the UE eventually performs uplink transmission in the first reference subframe.

Preferably, when calculating the PHR of an uplink carrier scheduled by two-step scheduling, if the UE is unable to exclude the possibility of performing uplink transmission in the first reference subframe by using the received first scheduling signaling, even though the UE can exclude the possibility of performing uplink transmission in the first reference subframe by using the subsequently received second scheduling signaling, the PHR type of the corresponding uplink carrier as a real PHR, regardless of whether the UE eventually performs uplink transmission in the first reference subframe.

Preferably, when calculating the PHR of an uplink carrier scheduled by two-step scheduling, if the UE has not received the first scheduling signaling in or before the second reference subframe, the PHR type of the corresponding uplink carrier is a virtual PHR.

Preferably, if the UE has received more than one first scheduling signaling in or before the second reference subframe, and/or the UE has received a first scheduling signaling for two-step scheduling and a signaling for one-step scheduling, the UE can determine the PHR of the corresponding uplink carrier by one or more of the following methods.

(1) If the UE has received a signaling for two-step scheduling and a signaling for one-step scheduling in the second reference subframe or before the second reference subframe, the UE determines the PHR type of the corresponding uplink carrier according to the result of the one-step scheduling.

(2) If the UE has received a signaling for two-step scheduling signaling and a signaling for one-step scheduling in the second reference subframe or before the second reference subframe, and if the signaling for one-step scheduling schedules the uplink transmission of a first subframe, a real PHR is calculated according to the one-step scheduling signaling; if the signaling for one-step scheduling does not schedule the uplink transmission of the first uplink subframe but the UE has received a first scheduling signaling for two-step scheduling, and the first reference subframe is within a valid time window of the first scheduling signaling, or the first reference subframe is within a time X ms after the valid time window of the first scheduling signaling (for example, X=1 ms, i.e., within 1 ms after the valid time window), the UE calculates a real PHR according to the first scheduling signaling. If the UE has received a multiple of first scheduling signalings, one of the first scheduling signalings can be selected in accordance with the way (3) so as to determine the real PHR.

(3) If the UE has received a multiple of first scheduling signalings in or before the second reference subframe, and the UE has not received second scheduling signalings corresponding to the first scheduling signalings, within the valid time window of the first scheduling signalings, the PHR type of the corresponding uplink carrier is a real PHR. Meanwhile, the UE selects, according to a predefined rule, one first scheduling signaling and then determines a real PHR, for example:

selecting the first one of the received first scheduling signalings as a reference, and calculating a real PHR, or, selecting the last one of the received first scheduling signalings as a reference, and calculating a real PHR, or, if all the first scheduling signalings are received in a same subframe, selecting a first scheduling signaling with a lowest PDCCH/EPDCCH search space index number as a reference, and calculating a real PHR.

Preferably, if the UE selects to transmit the PHR on a two-step scheduled PUSCH, the PHR of the uplink carrier of the PUSCH is calculated as a real PHR according to the received first scheduling signaling.

In a specific application scenario, the base station configures three uplink carriers for the UE, where the CC1 is a licensed frequency-band carrier, and the CC2 and the CC3 are unlicensed frequency band carriers. After the PHR triggering conditions are satisfied, the UE selects to report the PHR on the CC1, and the first reference subframe is $t_3$. In other words, the base station schedules the UE to transmit a PUSCH on the CC1 in the first reference subframe $t_3$, and the UE will contain the PHR report in the PUSCH. The second reference subframe is moment t, where t is prior to $t_3$. It is assumed that the CC1 and the CC2 is scheduled by one-step scheduling while the CC3 is scheduled by two-step scheduling. It is assumed that the UE has received, in or before the second reference subframe t, uplink scheduling signaling for the CC1 and CC2, and the UE has received a first scheduling signaling for the CC3 but not received a second scheduling signaling for the CC3. Then, the UE separately calculates real PHRs of the CC1, CC2 and CC3 according to the received scheduling signalings, as shown in FIG. 13.

In another specific application scenario, it is assumed that the UE has received, in the second reference subframe t, uplink scheduling signalings for the CC1 and CC2, and the UE has received a first scheduling signaling for the CC3 but not received a second scheduling signaling for the CC3, wherein the first scheduling signaling contains indication information about the transmission time which is delayed 6 ms with respect to the moment of the second scheduling signaling. If it is assumed that a time interval between the second reference subframe t and the first reference subframe $t_3$ is 5 ms, although the UE has not received the second scheduling signaling for the CC3 and thus cannot determine the uplink transmission time of the CC3, the UE can decide that the uplink transmission of the CC3 is absolutely later than the first reference subframe $t_3$. Even if the UE receives the second scheduling signaling as early as moment t+1, the triggered uplink transmission is also performed at t+1+6 ms. Hence, the UE separately calculates real PHRs of the CC1 and CC2 according to the received scheduling signalings, and calculates a virtual PHR of the CC3 according to the predefined format.

In still another specific application scenario, after the PHR triggering conditions are satisfied, the UE selects to report the PHR on the CC1, and the first reference subframe is $t_3$. In other words, the base station schedules the UE to transmit a PUSCH on the CC1 on the first reference subframe $t_3$, and the UE will contain the PHR report in the PUSCH. The second reference subframe is moment t, where t is prior to $t_3$. It is assumed that the CC1 is scheduled by one-step scheduling while the CC2 and CC3 is scheduled by two-step scheduling. It is assumed that the UE has received, in the second reference subframe t, an uplink scheduling signaling for the CC1, and the UE has received a first scheduling signaling for the CC3 but not received a second scheduling signaling for the CC3. Then, the UE calculates real PHRs of the CC1 and CC3 according to the received scheduling signalings, and calculates a virtual PHR of the CC2 according to the predefined format, as shown in FIG. 14.

In yet another specific application scenario, After the PHR triggering conditions are satisfied, the UE receives, in the second reference subframe, a one-step scheduling signaling UL grant for the CC1, the UE decides to report the PHR on the CC1, and the first reference subframe is $t_3$. In other words, the base station schedules the UE to transmit a PUSCH on the CC1 in the first reference subframe 6, and the UE will contain the PHR report in the PUSCH. On the CC2, the UE has not received, before the second reference subframe, a non-triggered first scheduling signaling for two-step scheduling or a UL grant for one-step scheduling, and the UE has received the first scheduling signaling after the second reference subframe. On the CC3, the UE has received a first scheduling signaling 1 (not triggered) before the second reference subframe, and has received another first scheduling signaling 2 (not triggered) in the second reference subframe; and, the first reference subframe is within the valid time of the two first scheduling signalings. Then, the UE calculates real PHRs of the CC1 and CC3 according to the received scheduling signalings, and calculates a virtual PHR of the CC2 according to the predefined reference format. Wherein, the real PHR of the CC3 is calculated according to the first scheduling signaling 1, as shown in FIG. 15.

It is to be noted that majority of the examples described herein show the transmission of the PHR on a licensed frequency band carrier, but they are also applicable to the transmission of the PHR on an unlicensed frequency band carrier. As described in the background art, in accordance with the existing standards, the UE can selectively transmit a PHR on a proper carrier.

If the PHR is transmitted on an unlicensed frequency band carrier and if the two-step scheduling is adopted, a time interval between the second scheduling signaling and the uplink transmission (containing the PHR) is generally not less than the minimum processing time delay of the uplink transmission. For example, if the PHR triggering conditions are satisfied at a subframe n, the UE receives a second scheduling signaling after the subframe n (a subframe m) and the PUSCH transmission triggered by the second scheduling signaling is performed in a subframe m+4 or after the subframe m+4, the UE can transmit PUSCH+PHR on this uplink carrier. For another example, if the second scheduling signaling has been received before the subframe n (a subframe l), but the PUSCH transmission triggered by the second scheduling signaling is performed in a subframe n+4 or after the subframe n+4, the UE can transmit PUSCH+PHR on this uplink carrier.

As shown in FIG. 16, the CC1 is a licensed frequency band carrier (by one-step scheduling). After the PHR triggering conditions are satisfied, the UE receives, in or before the second reference subframe, second scheduling signalings for the CC2 and CC3 for separately scheduling to transmit PUSCHs in a subframe p and a subframe q. A time interval between the subframe p and the second reference subframe is 4 ms, and a time interval between the subframe q and the second reference subframe is 6 ms. The UE selects to report the PHR on the CC2, the first reference subframe is $t_3$ (i.e., the subframe p), and the UE contains the PHR report in the PUSCH. When in or before the second reference subframe, the UE has not received a scheduling signaling for the CC1. The PHR of the CC1 is a virtual PHR. The PHR of the CC2 is a real PHR. Although the UE has received the first scheduling signaling for the CC3 before the second reference subframe, the PHR of the CC3 is a virtual PHR because the PUSCH transmission indicated by the second scheduling signaling received in the second reference subframe is not performed in the first reference subframe.

As another implementation, if the PHR is transmitted on an unlicensed frequency band carrier and if the two-step scheduling is adopted, the second reference subframe is generally a subframe after the UE has received a first scheduling signaling for scheduling the unlicensed frequency band carrier, and can be prior to a subframe of the second scheduling signaling. As described above, a time interval between the first scheduling signaling and the uplink transmission (containing the PHR) is not less than the minimum processing time delay of the uplink transmission. Therefore, the UE can have enough time to generate a PHR and a PUSCH. However, it is to be noted that, once the UE has generated the PHR, the UE will not change the PHR value even if the time interval between the subsequently received second scheduling signaling and the uplink transmission (containing the PHR) is not less than the minimum processing time delay of the uplink transmission.

As shown in FIG. 21, the CC1 is a licensed frequency band carrier (by one-step scheduling). After the PHR triggering conditions are satisfied in a subframe n−1, the UE receives, in a subframe n, a first scheduling signaling for the CC2, and the UE determines to transmit a PUSCH on the CC2. Hence, the second reference subframe is the subframe n, and the first reference subframe is a subframe n+x, where it is assumed that x=4. The UE starts generating an MAC packet and a PHR in the second reference subframe. Moreover, the UE receives a first scheduling signaling for the CC3 in a subframe n−2, a second scheduling signaling in a subframe n+1 for scheduling a PUSCH in a subframe n+2, and a one-scheduling signaling for the CC1 in the subframe n+2 for scheduling PUSCH transmission in a subframe n+6. Then, the PHR of the carrier CC2 transmitting the PHR is a real PHR. Since the CC1 adopting the one-step scheduling does not transmit a PUSCH in the first reference subframe n+4, the PHR of the CC1 is a virtual PHR. Since the CC3 by the two-step scheduling has received the first scheduling signaling in or before the second reference subframe and the first reference subframe n+4 is within the valid time of the first scheduling signaling, the PHR of the CC3 is a real PHR. Eventually, the UE receives a second scheduling signaling for the CC2 in a subframe n+5 for scheduling transmission of a PUSCH and a PHR in a subframe n+6. It is not hard to see that, although the licensed carrier CC1 transmits a PUSCH in the subframe n+6, the PHR reported by the UE is a virtual PHR; however, the unlicensed CC3 transmits a PUSCH in the subframe n+6, but the PHR reported by the UE is a real PHR.

It is to be noted that, the above description is illustrated by taking the PHR of a PUSCH as example, but the above ways are also applicable to the PHR of a PUCCH or the PHR of a PUSCH needing to take the influence of the PUCCH into consideration. For example, the calculation of the PHR of type 1 or the PHR of type 2 in the TS 36.213 5.1.1.2 is also related to whether the UE will transmit a PUCCH in a subframe i. Since the transmission of a downlink subframe is likely to occur on a multiple of carriers with different TTI lengths, and a time delay from the receipt of downlink data PDSCH by the UE to the report of an ACK/NACK in a PUCCH by the UE changes with different lengths, it is possible that the UE does not determine in the second reference subframe whether a PUCCH is to be transmitted in the first reference subframe. Then, the UE can assume whether to transmit a PUCCH in accordance with Way 1 or Way 2 in the step 802, so as to calculate a corresponding PHR. For example, if the UE does not determine in the second reference subframe whether a PUCCH is to be transmitted in the first reference subframe, then for an uplink carrier possibly transmitting the PUCCH, for example, Pcell, the value of the PHR is calculated on the assumption that the PUCCH is not to be transmitted. For example:

$$PH_{type2}(i) = P_{CMAX,c}(i) - 10\log_{10}\left( 10^{(10\log_{10}(M_{PUSCH,c}(i))+P_{O\_PUSCH,c}(j)+\alpha_c(j)\cdot PL_c+\Delta_{TF,c}(i)+f_c(i))/10} + 10^{(P_{0\_PUSCH}+PL_c+g(i))/10} \right)$$

and for an uplink carrier not transmitting the PUCCH, for example, Scell, the value of the PHR is calculated on the assumption that the PUCCH is not to be transmitted. For example:

$$PH_{type1,c}(i) = \tilde{P}_{CMAX,c}(i) - \{10\log_{10}(M_{PUSCH,c}(i))+P_{O\_PUSCH,c}(j)+\alpha_c(j)\cdot PL_c+\Delta_{TF,c}(i)+f_c(i)\}$$

It is to be noted that, if, in the step 801, the UE can only select to transmit a PUSCH on an one-step scheduled PUSCH, although majority of the examples described herein show the transmission of the PHR on a licensed frequency band carrier, and are also applicable to the transmission of the PHR on an one-step scheduled unlicensed frequency band carrier, it is unable to transmit the PHR on a two-step scheduled unlicensed frequency band carrier.

Way 3: For a carrier by two-step scheduling, the PHR type of the uplink carrier is a virtual PHR. In other words, regardless of whether the UE has received a first scheduling signaling and/or a second scheduling signaling in the first reference subframe, the UE reports a virtual PHR.

The UE only needs to, when generating a PHR report, for example, in the second reference subframe, decide that the uplink carrier is an uplink carrier by two-step scheduling. Then, the UE generates a virtual PHR of the corresponding carrier. For example, if in or before the second reference subframe, a first scheduling signaling has been received, but a signaling for one-step scheduling has not been received, the UE generates a virtual PHR of the corresponding carrier.

Further, if the UE decides in the second reference subframe that the uplink carrier adopts both the two-step scheduling and the one-step scheduling, the UE determines the PHR type according to the scheduling information about the one-step scheduling. For example, the UE has received two pieces of scheduling information in the second reference subframe, where one piece of scheduling information is a first scheduling signaling for two-step scheduling while the other piece of scheduling information is a scheduling signaling for one-step scheduling, and the uplink subframes scheduled by the two scheduling signalings are different. Wherein, if the scheduling signaling for one-step scheduling schedules the uplink transmission in the first reference subframe, the UE reports a real PHR regardless of the contents indicated by the two-step scheduling signaling; and, if the scheduling signaling for one-step scheduling schedules uplink transmission not in the first reference subframe, the UE reports a virtual PHR regardless of the contents indicated by the two-step scheduling signaling.

Further, if the UE has received neither the first scheduling signaling for two-step scheduling nor the scheduling signaling for one-step scheduling when generating the PHR report, the UE reports a virtual PHR.

It is not hard to see that, in Way 3, for a carrier to report the PHR, only when the UE receives a scheduling signaling for one-step scheduling which indicates to transmit an uplink signal in the first reference subframe, the UE generates a real PHR report; and, in other cases, the UE generates a virtual PHR report.

The PHR information provided for the base station in Way 3 is less effective than that provided in Way 1 and Way 2, but Way 3 is relatively simple.

Preferably, if the UE selects to transmit the PHR on a two-step scheduled PUSCH, the PHR of the uplink carrier of the PUSCH is calculated as a real PHR according to the received first scheduling signaling.

Preferably, if the UE selects to transmit the PHR on a two-step scheduled PUSCH, the PHR of the uplink carrier of the PUSCH is calculated as a virtual PHR.

Step 803: The UE generates a PHR of each uplink carrier according to the determined PHR value of each uplink carrier, and reports the generated PHR of each uplink carrier on the selected uplink carrier and in the selected first reference subframe.

Preferably, the UE can generate a PHR report of an MAC layer in accordance with the prior art and according to the PHR value calculated by the physical layer, and then transmit in the first reference subframe by the selected PUSCH of uplink carrier.

Preferably, if the UE selects to transmit the PHR on a two-step scheduled PUSCH, the UE can generate a PHR report of an MAC layer in accordance with the prior art and according to the PHR value calculated by the physical layer assuming a first reference subframe, and then transmit, in a subframe indicated by a second scheduling signaling, by the selected PUSCH of uplink carrier upon receiving the second scheduling signaling. In this case, a subframe eventually transmitting the PUSCH and the first reference subframe for calculating the PHR can be different subframes. However, for convenience of description, both are called as first reference subframes in the present invention.

Like the prior art, the PHR contains not only a PHR value, but also an indication of a real PHR or a virtual PHR, and/or a value of the maximum power Pcmax,c of the carrier.

In the present invention, clocks of the uplink carriers can be not aligned completely. For example, in the Carrier Aggregation (CA), it is supported that a difference in the advance amount of uplink transmission time of the UE on each aggregated uplink carrier is about 30 us. Within this time interval, it can be considered that the same subframes can be processed by the UE even if the subframes are later in time on some carriers.

Embodiment 3

In this embodiment, the basic steps are the same as Embodiment 2, i.e., the steps 801, 802 and 803. However, the specific way of selecting a carrier to transmit the PHR in the step 801 and the specific way of generating a PHR report of each carrier by the UE in the step 802 are different. Specifically:

If there are at least two carriers among a multiple of aggregated carriers, and when the minimum time delay from the receipt of an uplink scheduling signaling by the UE to the transmission of the scheduled uplink signal by the UE is different, and/or when the time slot duration (or called as the scheduled time unit TTI length) is different, when calculating a PHR of a corresponding subframe, the UE can calculate the PHR by one or more of the following four ways.

Way 1: When the UE selects to transmit PHRs on an uplink carrier with a longer TTI length, PHRs of other corresponding carriers with a shorter TTI length within the first reference subframe is calculated based on a first shorter TTI within the first reference subframe.

In a specific application scenario, the base station configures three uplink carriers for the UE, where the CC1 carrier has a subframe duration of 1 ms, the CC2 carrier has a subframe duration of 0.5 ms and the CC3 carrier has a subframe duration of 0.25 ms. After the PHR triggering conditions are satisfied, the UE selects to report the PHR on the CC1, and the first reference subframe is $t_3$ (subframe duration is 1 ms). In other words, the base station schedules the UE to transmit a PUSCH on the CC1 in the first reference subframe $t_3$, and the UE includes PHR reports of the CC1, CC2 and CC3 in the PUSCH. The PHR of the CC2 should be determined according to the uplink transmission condition of a first subframe of the CC2 within an uplink subframe L1 of the CC1, i.e., a subframe n1 of the CC2. The PHR of the CC3 should be determined according to the uplink transmission condition of a subframe m1 of the CC3. For example, if the UE transmits a PUSCH in a subframe n1 of the CC2, the PHR of the CC2 is a real PHR; and, if the subframe n1 of the CC2 is a downlink subframe or does not schedules a PUSCH, the PHR is a virtual PHR. This is applicable to the CC3, as shown in FIG. 17.

It is to be noted that, similar to the step 802 in Embodiment 2, the UE also decides the PHR of each carrier within the first reference subframe, according to whether has received a scheduling signaling for scheduling and/or triggering the UE to transmit a PUSCH in the first reference subframe, and/or the first scheduling signaling, and/or the second scheduling signaling has been received in or before the second reference subframe.

For example, even if each carrier adopts one-step scheduling, the minimum time delay from the receipt of the scheduling signaling by the UE to the transmission of the PUSCH by the UE may be different. For a carrier with a small TTI length, the minimum time delay is also short, as shown in FIG. 18.

It is assumed that the carrier CC1 has a subframe duration of 1 ms, and the time delay from the scheduling signaling to the PUSCH transmission is 4 ms; and, the carrier CC2 has a subframe duration of 0.25 ms, and the time delay from the scheduling signaling to the PUSCH transmission is 1 ms. Hence, after the PHR triggering conditions are satisfied, the UE selects to report the PHR on the CC1, and the first reference subframe is $t_3$. In other words, the base station schedules the UE to transmit a PUSCH on the CC1 in the first reference subframe $t_3$, and the UE includes PHR reports of the CC1 and CC2 in the PUSCH. In the second reference subframe t (after the PHR triggering conditions are satisfied), the UE starts preparing PHR reports of the CC1 and CC2. Since the UE has not received the scheduling signaling for the CC2 on the second reference subframe moment t, the UE calculates the PHR of the CC2 in accordance with the virtual PHR even if the UE has subsequently received the scheduling signaling for the CC2 for scheduling the UE to transmit a PUSCH in a subframe m1 of the CC2.

Like the prior art, the PHR contains not only a PHR value, but also an indication of a real PHR or a virtual PHR, and/or a value of the maximum power Pcmax,c of the carrier.

Way 2: When the UE selects to transmit PHRs on an uplink carrier with a longer TTI length, PHRs of other corresponding carriers with a shorter TTI length within the first reference subframe is calculated based on the first scheduled shorter TTI within the first reference subframe. If there is no shorter subframe is scheduled within the first reference subframe, reporting a PHR of the first shorter TTI within the first reference subframe, or reporting a PHR of any shorter TTI within the first reference subframe, where the PHR is a virtual PHR.

Preferably, the UE does not need to report an indication of a TTI index.

Preferably, the UE reports not only the PHR but also an indication of a TTI index. Preferably, N bits are added in the PHR signaling to indicate index indications of N shorter TTIs in the first reference subframe.

For example, the base station configures three uplink carriers for the UE, where the CC1 carrier has a subframe duration of 1 ms, the CC2 carrier has a subframe duration of 0.5 ms and the CC3 carrier has a subframe duration of 0.25 ms. After the PHR triggering conditions are satisfied, the UE selects to report the PHR on the CC1, and the first reference subframe is $t_3$. In other words, the base station schedules the UE to transmit a PUSCH on the CC1 on the first reference subframe 6, and the UE includes PHR reports of the CC1, CC2 and CC3 in the PUSCH. If the base station schedules the CC2 to transmit a PUSCH in a subframe n1+1, and the UE has received an uplink scheduling signaling for scheduling the PUSCH transmission on CC2 in subframe n1+1 before preparing the PHR, the UE calculates the PHR of the CC2 in accordance with the subframe n1+1. Since the PUSCH transmission has been scheduled, the PHR of the CC2 is a real PHR. This is applicable to the CC3, as shown in FIG. 19. If the UE needs to further report an indication of the subframe index, the PHR of the CC2 needs to indicate a second subframe within the first reference subframe, and the PHR of the CC3 indicates a second subframe within the first reference subframe.

It is to be noted that, similar to Embodiment 2, the UE also decides the PHR of each carrier within the first reference subframe, according to whether a scheduling signaling for scheduling and/or triggering the UE to transmit a PUSCH in the first reference subframe, and/or the first scheduling signaling, and/or the second scheduling signaling has been received in or before the second reference subframe. For example, in FIG. 9, when preparing the PHR, if the UE has not received a scheduling signaling for scheduling the subframe n1+1 of the carrier CC2 to transmit a PUSCH, the UE reports the PHR of the CC2 as a virtual PHR based on subframe n1.

Way 3: When the UE selects to transmit PHRs on an uplink carrier with a longer TTI length, PHRs of other corresponding carriers with a shorter TTI length within the first reference subframe is calculated based on a shorter TTI within the first reference subframe, which is up to UE implementation.

Preferably, the UE does not need to report an indication of a TTI index.

Preferably, the UE reports not only the PHR but also an indication of a TTI index.

For example, the base station configures three uplink carriers for the UE, where the CC1 carrier has a subframe duration of 1 ms, the CC2 carrier has a subframe duration of 0.5 ms and the CC3 carrier has a subframe duration of 0.25 ms. After the PHR triggering conditions are satisfied, the UE selects to report the PHR on the CC1, and the first reference subframe is $t_3$. In other words, the base station schedules the UE to transmit a PUSCH on the CC1 on the first reference subframe $t_3$, and the UE includes PHR reports of the CC1, CC2 and CC3 in the PUSCH. The UE can select to report any one of two subframes of the CC2 within an uplink subframe L1 of the CC1 to calculate the PHR of the CC2. For example, the UE can select the subframe n1+1 to calculate the PHR. Since the PUSCH transmission has been scheduled, the PHR is a real PHR. This is applicable to the CC3.

Preferably, the UE calculates the PHR by preferentially considering whether a subframe has been determined on the second reference subframe t to transmit a PUSCH. For example, if, for subframes m1 and m1+1 of the CC3, it has been determined on the second reference subframe t that the subframe m1 does not transmit a PUSCH and the subframe m+1 transmits a PUSCH, but it has not been determined on the second reference subframe t whether subframes m1+2 and m1+3 transmit a PUSCH, the UE will select one of the subframes m1 and m1+1 to calculate the PHR.

Preferably, when reporting the PHR value and the PHR type (virtual or real), the UE will also report the referenced subframe. For example, for the carrier CC3, two bits can be used to indicate that the reported PHR is which one of the subframes m1 to m1+3.

Way 4: When the UE selects to transmit PHRs on an uplink carrier with a shorter TTI length, PHRs of other corresponding carriers with a longer TTI length overlapping with the first reference subframe should be calculated according to a TTI containing the first reference subframe. The calculation of a PHR of an uplink carrier with a smaller TTI length can be performed in accordance with one of the Ways 1 to 3.

For example, the base station configures three uplink carriers for the UE, where the CC1 carrier has a subframe duration of 1 ms, the CC2 carrier has a subframe duration of 0.5 ms and the CC3 carrier has a subframe duration of 0.25 ms. After the PHR triggering conditions are satisfied, the UE selects to report the PHR on the CC3, and the first reference subframe is $t_3$. In other words, the base station schedules the UE to transmit a PUSCH on the CC3 on the first reference subframe $t_3$ (subframe m1+1), and the UE includes PHR reports of the CC1, CC2 and CC3 in the PUSCH. On the CC1, no uplink transmission is scheduled in a subframe L1 containing the subframe m1+1 of the CC3, so the PHR is a virtual PHR. On the CC2, no uplink transmission is scheduled in a subframe n1 containing the subframe m1+1 of the CC3, so the PHR is a virtual PHR. The PHR of the CC3 is a real PHR, as shown in FIG. 20.

In this embodiment, it is assumed that the UE has determined the TTI length of each carrier of the first reference subframe before the second reference subframe t. For example, the change in TTI length is configured semi-statically. On the other hand, if the UE is unable to determine the TTI length of each carrier within the first reference subframe before the second reference subframe t, for example, if the TTI length of some carriers changes dynamically and the UE has not received any information indicative of the TTI length before the second reference subframe t, the UE calculates a virtual PHR according to the predefined reference TTI length.

Embodiments 2 and 3 of the present invention have been described mainly with respect to a Carrier Aggregation (CA) scenario. The UE reports PHRs of all activated uplink carriers. The present invention is also applicable to a dual-connectivity scenario. The UE reports, to each eNB, PHRs of all activated uplink carriers under this eNB, and PHRs of all activated uplink carriers under another eNB. The PHRs of the another eNB can be always reported as virtual PHRs in accordance with the higher-layer configuration; or the PHRs are reported according to the scheduling condition and in accordance with the higher-layer configuration. In this case, the calculation and reporting of the PHRs can be performed according to the methods provided by the present invention.

Further, the base station can also group the activated uplink carriers of the UE. For example, uplink carriers with a longer TTI and uplink carriers with a shorter TTI are classified into two groups. Each group reports PHRs in this group, and for the other group, reporting PHRs as virtual PHRs or reporting in accordance with the scheduling condition is configured by a higher layer, or only virtual PHRs are reported.

In another aspect of the embodiment, when waveforms used in different carries may be different, for example, one carrier uses the OFDM modulation while another carrier uses the SC-FDMA or OFDM modulation, then when the UE selects one carrier to report the PHR, for example, selects CC1 to report the PHR, the PHR is determined according to the waveform of CC1. For other carriers, if the PHR is a virtual PHR, the virtual PHR is calculated according to the predefined waveform. The power control parameters corresponding to different waveforms may be different, for example, parameters such as Po and $\alpha$. Therefore, the value of the virtual PHR for different waveforms may also be different. The predefined waveform can be determined by one of the following methods: (1) the predefined waveform is a waveform semi-statically configured for PUSCH transmission, or (2) the predefined waveform is a default waveform specified by the standard, or (3) the predefined waveform is a waveform of a PUSCH transmitted in the last time, and the UE reports, to the base station, the waveform on which the virtual PHR is based, or (4) the predefined waveform is decided by the UE itself, and the UE reports, to the base station, the waveform on which the virtual PHR is based.

Preferably, when the base station semi-statically instructs the UE to change the waveform x to waveform y, the accumulation-type closed-loop power control parameter $f_c(i)$ for waveform y should be reset as $f_c(0)$.

Embodiment 4

Based on the power allocation method provided in Embodiment 1, Embodiment 4 of the present invention provides a user equipment for power allocation. As shown in FIG. 22, the user equipment comprises a power determination module 1901 and an adjustment module 1902.

Specifically, the power determination module 1901 receives uplink scheduling information, and determines a corresponding uplink transmit power on each uplink carrier according to the uplink scheduling information, a first reference subframe being a subframe which is determined according to the uplink scheduling information to transmit an uplink channel/signal; and, the adjustment module 1902 adjusts, according to an actual maximum uplink transmit power of the first reference subframe of the user equipment and a predefined first priority, the determined uplink transmit power of each uplink carrier, and/or determines whether to transmit an uplink signal.

In the solutions of the present invention, the specific function implementation of the modules in the user equipment for power allocation provided in Embodiment 4 can refer to the specific the steps of the power allocation method provided in Embodiment 1, and will not be repeated here.

Embodiment 5

Based on the method for reporting headroom provided in Embodiment 2 and Embodiment 3, Embodiment 5 of the present invention provides a user equipment for reporting power headroom. As shown in FIG. 23, the user equipment comprises a selection module 2001, a PHR value determination module 2002 and a report module 2003.

Specifically, the selection module 2001 selects, from at least one uplink carrier, one uplink carrier for reporting a Power Headroom Report (PHR) when conditions for reporting the PHR are satisfied, and determines an uplink subframe to transmit the PHR, the uplink subframe being a first reference subframe; the PHR value determination module 2002 determines, according to uplink scheduling information received in or before a second reference subframe or according to whether or not a carrier scheduled by two-step scheduling, PHR contents of each uplink carrier to be reported on the first reference subframe, and determines a corresponding PHR value according to the PHR contents; and, the report module 2003 generates a PHR of each uplink carrier according to the determined PHR value of each uplink carrier, and reports the generated PHR of each uplink carrier on the selected uplink carrier and in the selected first reference subframe.

In the solutions of the present invention, the specific function implementation of the modules in the user equipment for reporting power headroom provided in Embodiment 5 can refer to the specific steps of the method for reporting power headroom provided in Embodiment 2 and Embodiment 3, and will not be repeated here.

The foregoing descriptions are merely some implementations of the present invention. It should be noted that, to a person of ordinary skill in the art, various improvements and modifications can be made without departing from the principle of the present invention, and these improvements and modifications shall be regarded as falling into the protection scope of the present invention.

The invention claimed is:

1. A method for transmitting power headroom information by a terminal in a wireless communication system, the method comprising:
  receiving, on a first serving cell from a base station, first uplink scheduling information in a first subframe, wherein the first uplink scheduling information schedules a transmission in a second subframe;
  identifying power headroom information for a second serving cell based on whether second uplink scheduling information scheduling a transmission in the second subframe is received on the second serving cell in or earlier than the first subframe; and transmitting, on the first serving cell to the base station, the power headroom information for the second serving cell in the second subframe,
wherein the second serving cell is a cell on an unlicensed band.

2. The method of claim 1,
wherein the second uplink scheduling information triggers the transmission in the second subframe on the second serving cell, in case that third uplink scheduling information associated with the second uplink scheduling information is received prior to the second uplink scheduling information.

3. The method of claim 1,
wherein, in case that the second uplink scheduling information is received on the second serving cell in or earlier than the first subframe, the power headroom information for the second serving cell is obtained by considering that the terminal performs a physical uplink shared channel (PUSCH) transmission on the second serving cell in the second subframe, and
wherein, in case that the second uplink scheduling information is not received on the second serving cell in or earlier than the first subframe, the power headroom information for the second serving cell is obtained by considering that the terminal does not perform a PUSCH transmission on the second serving cell in the second subframe.

4. The method of claim 1,
wherein the first subframe is prior to the second subframe and a time interval between the first subframe and the second subframe is 4 subframes.

5. A terminal for transmitting power headroom information in a wireless communication system, the terminal comprising:
a transceiver; and
a controlled coupled with the transceiver and configured to:
receive, on a first serving cell from a base station, first uplink scheduling information in a first subframe, wherein the first uplink scheduling information schedules a transmission in a second subframe,
identify power headroom information for a second serving cell based on whether second uplink scheduling information scheduling a transmission in the second subframe is received on the second serving cell in or earlier than the first subframe, and
transmit, on the first serving cell to the base station, the power headroom information for the second serving cell in the second subframe,
wherein the second serving cell is a cell on an unlicensed band.

6. The terminal of claim 5,
wherein the second uplink scheduling information triggers the transmission in the second subframe on the second serving cell, in case that third uplink scheduling information associated with the second uplink scheduling information is received prior to the second uplink scheduling information.

7. The terminal of claim 5,
wherein, in case that the second uplink scheduling information is received on the second serving cell in or earlier than the first subframe, the power headroom information for the second serving cell is obtained by considering that the terminal performs a physical uplink shared channel (PUSCH) transmission on the second serving cell in the second subframe, and wherein, in case that the second uplink scheduling information is not received on the second serving cell in or earlier than the first subframe, the power headroom information for the second serving cell is obtained by considering that the terminal does not perform a PUSCH transmission on the second serving cell in the second subframe.

8. The terminal of claim 5,
wherein the first subframe is prior to the second subframe and a time interval between the first subframe and the second subframe is 4 subframes.

9. A method for receiving power headroom information by a base station in a wireless communication system, the method comprising:
transmitting, on a first serving cell to a terminal, first uplink scheduling information in a first subframe, wherein the first uplink scheduling information schedules a transmission in a second subframe; and
receiving, on the first serving cell from the terminal, power headroom information for a second serving cell in the second subframe,
wherein the power headroom information for the second serving cell is identified based on whether second uplink scheduling information scheduling a transmission in the second subframe is transmitted on the second serving cell in or earlier than the first subframe, and
wherein the second serving cell is a cell on an unlicensed band.

10. The method of claim 9,
wherein the second uplink scheduling information triggers the transmission in the second subframe on the second serving cell, in case that third uplink scheduling information associated with the second uplink scheduling information is transmitted prior to the second uplink scheduling information.

11. The method of claim 9,
wherein, in case that the second uplink scheduling information is transmitted on the second serving cell in or earlier than the first subframe, the power headroom information for the second serving cell is obtained by considering that the terminal performs a physical uplink shared channel (PUSCH) transmission on the second serving cell in the second subframe, and
wherein, in case that the second uplink scheduling information is not transmitted on the second serving cell in or earlier than the first subframe, the power headroom information for the second serving cell is obtained by considering that the terminal does not perform a PUSCH transmission on the second serving cell in the second subframe.

12. The method of claim 9, wherein the first subframe is prior to the second subframe and a time interval between the first subframe and the second subframe is 4 subframes.

13. A base station for receiving power headroom information in a wireless communication system, the base station comprising:
a transceiver; and
a controller coupled with the transceiver and configured to:
transmit, on a first serving cell to a terminal, first uplink scheduling information in a first subframe, wherein the first uplink scheduling information schedules a transmission in a second subframe, and
receive, on a first serving cell from the terminal, power headroom information for a second serving cell in the second subframe, wherein the power headroom information for the second serving cell is identified based on whether second uplink scheduling information scheduling a transmission in the second subframe is transmitted on the second serving cell in or earlier than the first subframe, and wherein the second serving cell is a cell on an unlicensed band.

14. The base station of claim 13, wherein the second uplink scheduling information triggers the transmission in the second subframe on the second serving cell, in case that third uplink scheduling information associated with the second uplink scheduling information is transmitted prior to the second uplink scheduling information.

15. The base station of claim 13, wherein, in case that the second uplink scheduling information is transmitted on the second serving cell in or earlier than the first subframe, the power headroom information for the second serving cell obtained by considering that the terminal performs a physical uplink shared channel (PUSCH) transmission on the second serving cell in the second subframe, and wherein, in case that the second uplink scheduling information is not transmitted on the second serving cell in or earlier than the first subframe, the power headroom information for the second serving cell is obtained by considering that the terminal does not perform a PUSCH transmission on the second serving cell in the second subframe.

16. The base station of claim 13, wherein the first subframe is prior to the second subframe and a time interval between the first subframe and the second subframe is 4 subframes.

* * * * *